(12) United States Patent  (10) Patent No.: US 7,954,877 B2
Smith et al.  (45) Date of Patent: Jun. 7, 2011

(54) TARPING SYSTEM FOR OPEN TOP CONTAINERS

(75) Inventors: Fred P. Smith, Alpine, UT (US); Nathan H. Morrill, Draper, UT (US)

(73) Assignee: Smith Patents, L.L.C., Alpine, UT (US)

( * ) Notice: Subject to any disclaimer, the term of this patent is extended or adjusted under 35 U.S.C. 154(b) by 0 days.

(21) Appl. No.: 12/497,238

(22) Filed: Jul. 2, 2009

(65) Prior Publication Data

US 2009/0278376 A1  Nov. 12, 2009

Related U.S. Application Data

(63) Continuation of application No. 12/218,675, filed on Jul. 17, 2008, now Pat. No. 7,673,926, which is a continuation of application No. 11/732,375, filed on Apr. 3, 2007, now Pat. No. 7,458,629.

(60) Provisional application No. 60/788,843, filed on Apr. 3, 2006.

(51) Int. Cl.
*B60P 7/02* (2006.01)
(52) U.S. Cl. ............ 296/100.17; 296/100.12; 296/100.1
(58) Field of Classification Search ............ 296/100.07, 296/100.08, 100.1, 100.12, 100.14, 100.15, 296/100.17, 100.18; 49/345
See application file for complete search history.

(56) References Cited

U.S. PATENT DOCUMENTS

| | | | |
|---|---|---|---|
| 4,225,175 A * | 9/1980 | Fredin | 296/98 |
| 4,542,931 A | 9/1985 | Walker, Jr. | |
| 4,627,658 A | 12/1986 | Vold et al. | |
| D290,591 S | 6/1987 | Shirvanian | |
| 4,767,152 A | 8/1988 | Stluka et al. | |
| 6,041,548 A | 3/2000 | Miller | |
| 6,402,224 B1 | 6/2002 | Monaco et al. | |
| 6,695,390 B2 * | 2/2004 | Bucco Morello | 296/186.4 |
| 6,916,060 B2 * | 7/2005 | Searfoss | 296/98 |
| 6,921,123 B2 * | 7/2005 | Wagner | 296/107.17 |
| 7,147,264 B2 * | 12/2006 | Morrow | 296/100.1 |
| 7,413,234 B2 * | 8/2008 | Smith et al. | 296/100.15 |
| 7,458,629 B2 * | 12/2008 | Smith et al. | 296/100.18 |
| 2005/0127705 A1 | 6/2005 | Morrow | |
| 2006/0043755 A1 | 3/2006 | Coughtry | |
| 2006/0208526 A1 | 9/2006 | Talbot et al. | |
| 2008/0042466 A1* | 2/2008 | Searfoss | 296/100.01 |

FOREIGN PATENT DOCUMENTS

| AU | 2002300170 B2 | 2/2004 |
|---|---|---|
| JP | 57205223 | 12/1982 |

* cited by examiner

*Primary Examiner* — Jason S Morrow
(74) *Attorney, Agent, or Firm* — Sand & Sebolt

(57) ABSTRACT

A relatively lightweight tarping system for use with trailers or other open top containers includes first and second spaced frame members and an elongated flexible member such as a cable or chain connected to and extending therebetween. A tarpaulin may be mounted thereon so that the frame members, flexible member and tarpaulin are pivotable between a covered position atop the open top container and an uncovered position. A four-bar linkage is preferably used in combination with a rotational drive mechanism to provide various advantages in rotating the tarpaulin assembly between the covered and uncovered positions. A width adjustment mechanism is provided to provide usage with trailers or other open top containers of different widths. An improved seal is provided between the tarpaulin and container.

20 Claims, 22 Drawing Sheets

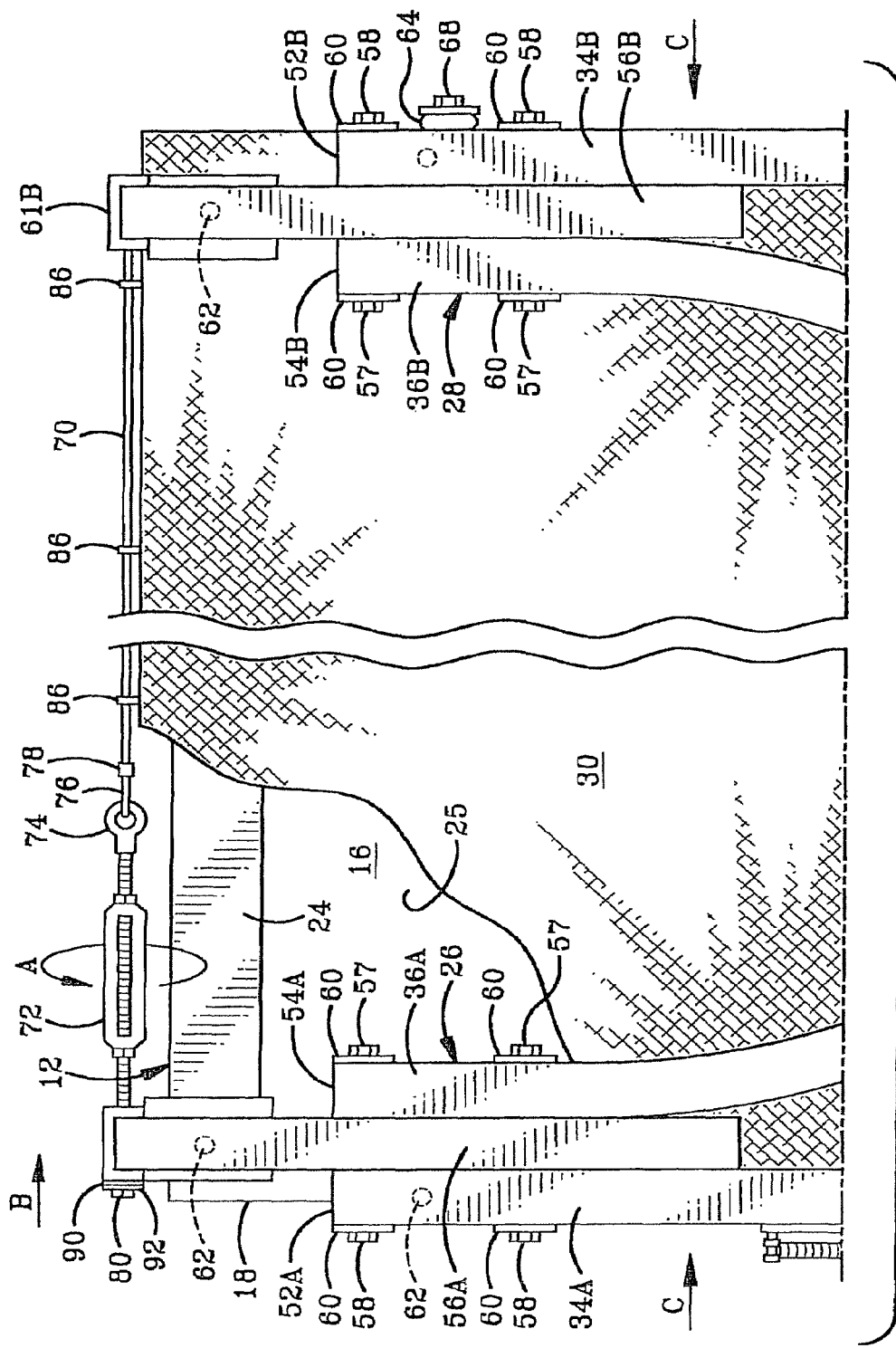

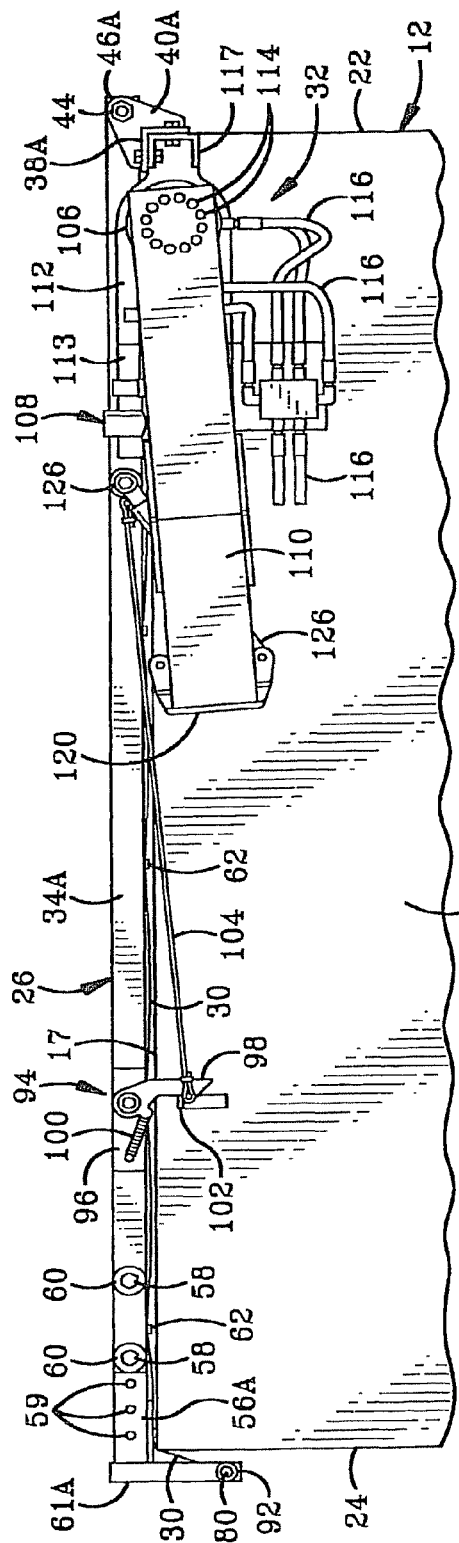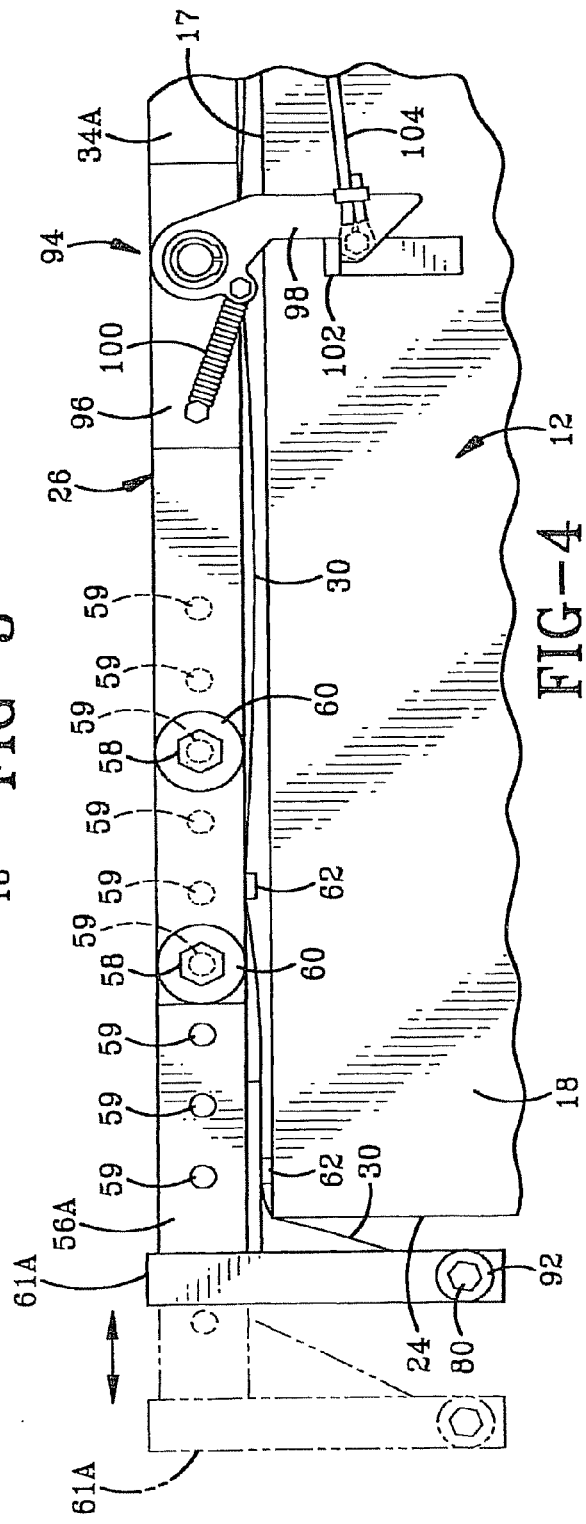

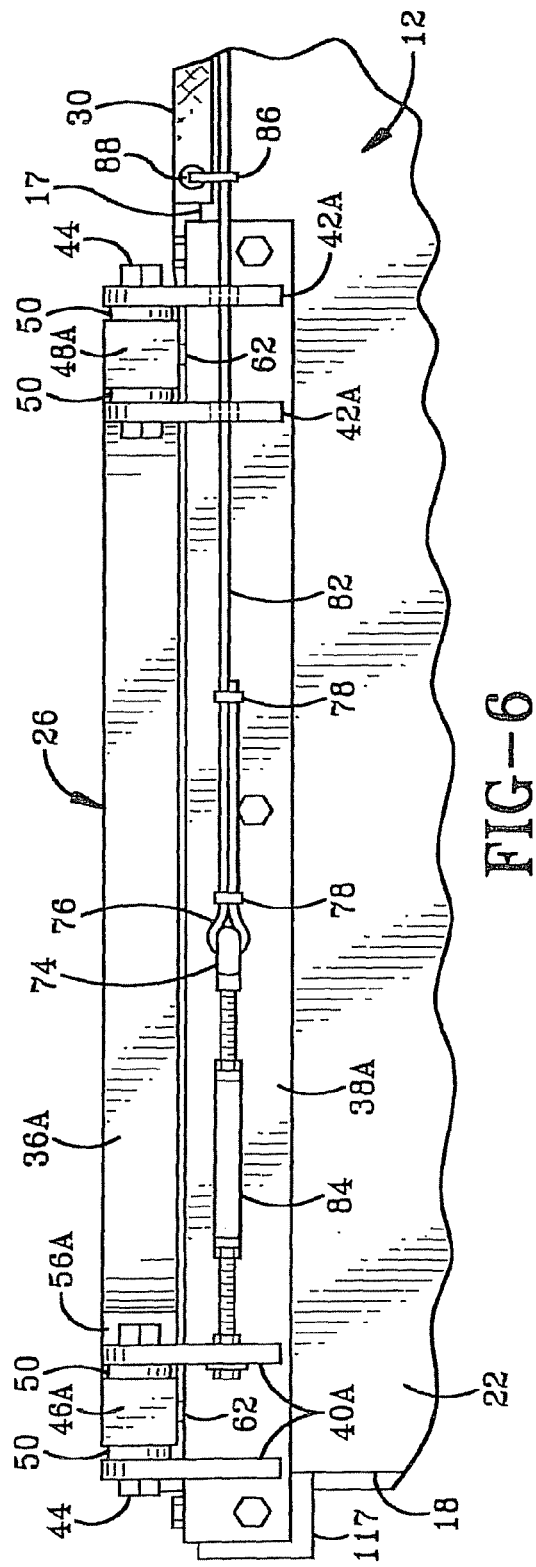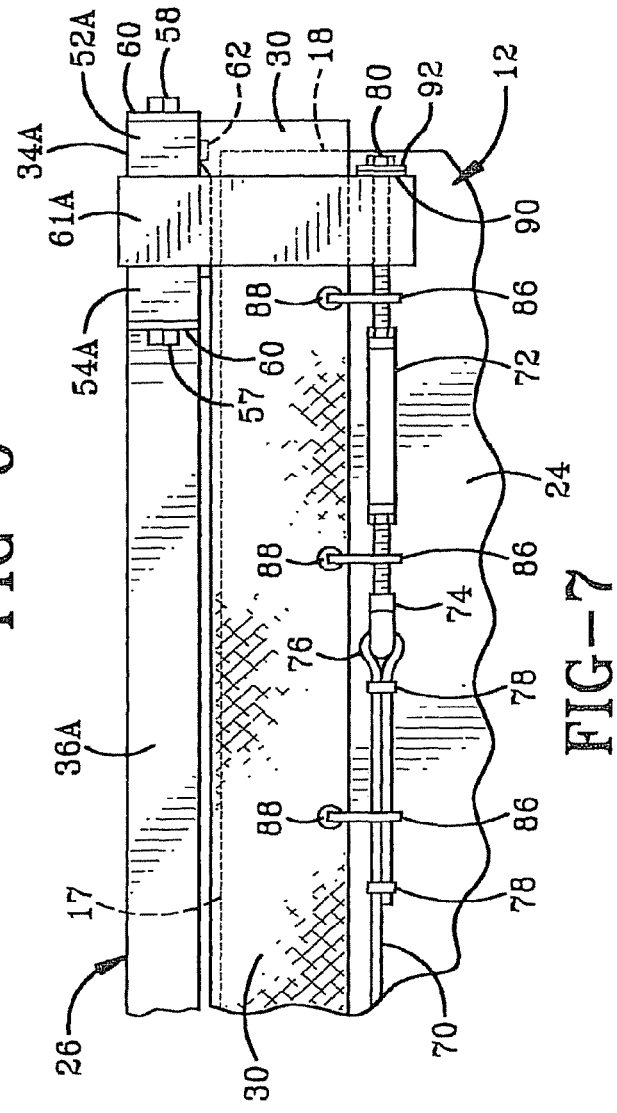

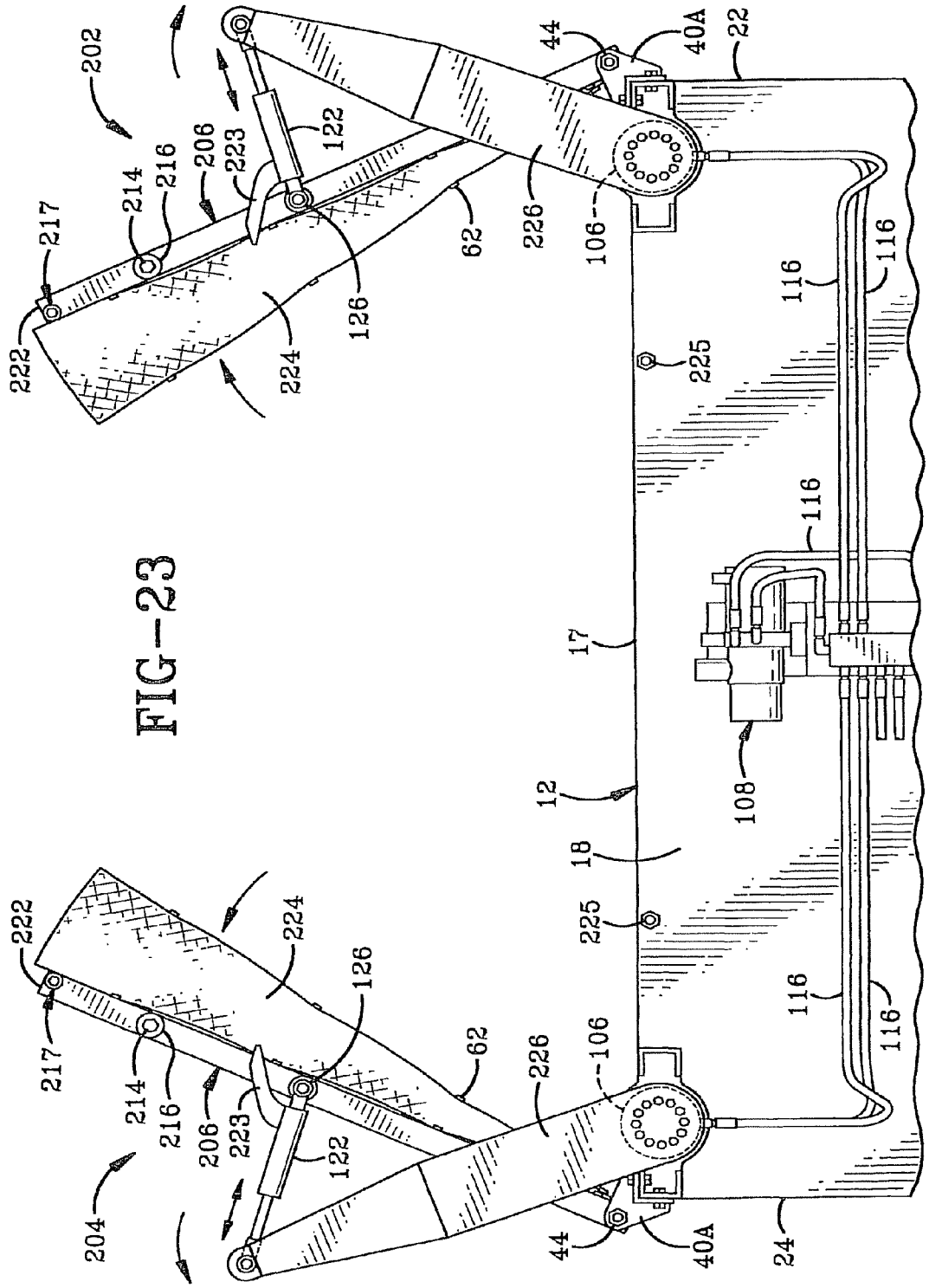

TARPING SYSTEM FOR OPEN TOP CONTAINERS

CROSS REFERENCE TO RELATED APPLICATION

This application claims priority from U.S. patent application Ser. No. 12/218,675, filed Jul. 17, 2008, which is a continuation of U.S. patent application Ser. No. 11/732,375, filed Apr. 3, 2007, now U.S. Pat. No. 7,458,629, and U.S. Provisional Application Ser. No. 60/788,843 filed Apr. 3, 2006; the disclosures of which are incorporated herein by reference.

BACKGROUND OF THE INVENTION

1. Technical Field

The invention relates generally to a tarping system for covering open top trailers. More particularly, the invention relates to such a system in which a support assembly and tarpaulin are mounted thereon and movable between a covered position atop the trailer to an uncovered position beside the trailer. Specifically, the invention relates to such a device in which the support system and tarpaulin are pivoted between the covered and uncovered positions.

2. Background Information

It has been long been necessary to cover trailers in order to keep their contents from blowing out especially when the trailer is being pulled. Laws and regulations have been adopted in many areas specifying that these trailers be covered during transit for this purpose. Even where laws to this effect do not exist, it is nonetheless beneficial to cover the trailers to prevent the various negative results of material coming out of the trailers.

Transfer trailers are typically used to haul refuse from a transfer station to a landfill. They are typically loaded from the top by a wheel loader or the like, covered to keep the contents therein and uncovered upon arrival at the landfill. The tailgate of the transfer trailer is then opened and a tipper dumps the trailer to empty its load. Other dumping mechanisms may be used such as a shuffle floor. Many trailers may be quite long, for instance 53 feet or even longer. The maximum trailer widths for highways are typically either 96 inches or 102 inches. Federal highways allow for 102 inch wide trailer bodies whereas some local areas may restrict the maximum to 96 inches. Laws and regulations also generally allow for an additional width of 3 inches on each side of the trailer body to allow for safety equipment such as lighting, tarping systems and so forth. Thus, the overall width of a tarping system for a highway trailer is limited to a maximum of 102 inches for the 96 inch body and 108 inches for the 102 inch body. While it is possible to manually cover such trailers, it is time consuming, expensive and often unsafe. Manual tarping may take 30 minutes or more. Manual tarping also requires the operator to climb on top of the load to spread the tarp and tie it down, which can be dangerous especially if the load is refuse or the like. In addition, trailers can be 13 feet tall or more, thus subjecting operators to fall hazards.

The various types of truck hauling systems typically fall into 3 categories. The first is cable tarp systems, which are represented in patents such as U.S. Pat. Nos. 2,469,958; 4,067,603; 4,189,178; 4,725,090; 5,102,182; 5,253,914; 6,142,554 and 6,250,233. The first category employs a continuous loop of cable along the top of each side wall of the trailer which is revolvable with a sheave at the front or rear of the trailer and a driven sheave at the opposite end. Bows or other cross members extend across the trailer with the tarpaulin connected thereto. The bows are rigid rods or the like having an arch shape or the like which extend upwardly and over the trailer. The rearmost bow is connected to the cable and the other bows are configured to slide or slip along the cable so that movement of the cable during the revolution of the endless cable loop pulls the rear most bow with it whereby the tarpaulin in turn pulls the remainder of the bows to cover the trailer.

Because trailer walls are typically at or near the maximum height allowed, the use of a bow or arch shaped member may put the trailer over the maximum height. On the other hand, if the cross members are straight instead of bowed, the tarpaulin tends to be dragged over the load, thus destroying the tarpaulin and preventing the use of the tarpaulin system with loads that are heaped above the trailer walls. Refuse and other materials tend to destroy tarpaulins relatively quickly and replacement of a tarpaulin is labor intensive on this type of system. In addition, especially with longer trailers the movements of the two endless loop cables are likely to get out of timing with one another due to cable stretch, which causes the bows to rack, thus making deployment of the tarpaulin difficult and requiring additional maintenance. This type of system also requires a substantial amount of space to store the tarpaulin in its un-deployed position near the front of the trailer, making complete loading of the trailer more difficult. In addition, if the side walls belly out, they may hit the cable and make actuation difficult or impossible.

The second category of tarping systems is a roll type system as shown U.S. Pat. Nos. 2,976,082; 3,384,413; 3,785,694; 4,302,043; 4,505,512; 4,657,062; 4,691,957; 4,834,445; 5,002,328; 5,180,203; 5,549,347; 5,762,002; 5,765,901 and 6,142,553. The end of the tarpaulin in the roll system is attached to the side wall of the trailer and the other end is attached to a torque tube or torsion member that rolls the tarpaulin over the width of the trailer. The tube is held down by means of straps, chains or the like to stretch the tarpaulin over the top of the trailer. Most of these systems are cranked by hand although some are powered.

One problem with roll systems is that they are not fully automatic. The operator must manually tie down the tarp and in most cases manually roll the tarp onto the trailer, which is time consuming. For longer trailers, the torque tube requires a center support extending across the top of the trailer to prevent deformation of the torque tube, which makes rotating the tube very difficult. As previously noted, the trailer walls are typically near or at the maximum height and if an arch is used to roll the tarp over, it may cause the trailer to be over the maximum height. If no arch is used, the tarpaulin must sometimes roll across a heaped load which can cause damage to the tarpaulin and may be impossible without the operator climbing on top of the load to hoist the roll over any pieces which stick up abruptly from the load. Thus, this type of system is typically time consuming, labor intensive and possibly hazardous.

The third category of tarping systems is the flip tarp system. These tarping systems typically have tarpaulins that flip or rotate approximately 270 degrees from a generally horizontal deployed or covered position over the load to a vertical uncovered or stowed position along the side of the trailer. This type of system allows loading from either side of the trailer. The flip tarp systems typically have a structure which is hinged on the top of one or both side walls with a tarpaulin connected thereto. Some of these systems may use a cable extending the length of the trailer to offer additional support to the tarpaulin. Such systems use an opening mechanism mounted on the front of the trailer to rotate the frame structure about the hinges. Examples are shown in US Patent Application Publications 20060043755 and 20050127705, as well as in U.S. Pat. Nos. 6,983,975; 6,402,224 and 5,542,734. Each of these examples uses hinges on one side of the trailer and opens the covering to one side. Other flip tarp systems utilize a cover which has been split into two longitudinal sections that hinge on each of the side walls of the trailer, as shown in U.S. Pat. Nos. D290591, 4,767,152, 4,627,658, 4,542,931, 4,210,358, 2,408,132 and 1,209,265. Although U.S. Pat. No. 4,627,658 shows an operating mechanism at the rear of the trailer, it is generally unfeasible due to the fact that there is no room on a standard trailer as a result of tailgate, width and height limitations. Thus, the other prior art configurations use some sort of frame structure or torsion member running from the front of the trailer to the rear of the trailer in order to operate rear portion of the tarping system.

One disadvantage of the prior flip tarp systems relates to the prior belief that a torsional structure running the length of a trailer was required to flip the entire tarp over. Because trailers can be 53 feet long or more, using a frame or torsional structure to operate the rear and/or central portions of the tarping system requires substantial structure and the associated weight thereof. For example, one prior art flip tarp system uses a 1½ inch solid shaft for the torsional member which weighs over 300 pounds. Due to weight limits imposed by law, this results in reducing the amount of the payload that can be hauled within the trailer.

In addition, the top rails of these trailers move, deflect and belly outward. Thus, if the longitudinal frame or torsional member is hinged where the trailer bellies out, the frame structure must also deflect in the center, causing undue stress and premature failure of the tarping system. If the frame or torsional member is not hinged at the center section of the trailer wall and the wall bows out in the center, the wall can keep the frame or torsional member from swinging all the way around to lie next to the trailer wall. Either way, this can put the frame or torsional member into a bind, causing the tarping system to cease functioning. Moreover, a loader may run up against the side of the trailer during loading and damage the frame or torsional member when using the stated position against the side of the trailer. Furthermore, because a low height is desirable, the frame or torsional member typically is barely adequate to take the torsion from the driven member at the front of the trailer to the rear, and thus it is somewhat flexible. Thus, although the frame or driven member may be held down by the actuating mechanism at the front of the trailer, only the torsion member serves to hold the tarping mechanism down at the back.

Prior flip tarping systems typically do not do a very good job of keeping the material or load within the body of trailer. As the trailer is pulled down the highway causing air to blow relative thereto, the air may blow material out the rear of the trailer. The light torsion tube or frames as discussed above do not suitably keep the tarping system held down in the rear of the trailer. The bumping up and down of the tarping system or the upward blowing by wind on the tarp tends to cause cracks therein which create openings through which material can escape. These prior systems also typically fail to suitably hold the tarping material down along the sides of the trailer body, thus creating gaps through which material may be blown out. These prior art systems do not allow for holding down the moving side of the tarp over the side of the trailer by a few inches. If the middle of the trailer bellies out, the tarp will sit on top of the bellied out middle of the wall, leaving a substantial crack between the cable and wall at the front and the rear of the trailer through which material may be blown out. In addition, tarping systems which require a lateral frame structure at the center portion of the trailer for supporting the tarpaulin can be an impediment to sealing. More particularly, when the load is heaped up above the side walls of the trailer, the lateral frame structure lies atop the heaped up load so that the tarping system cannot seal around its periphery, thus allowing the material to escape.

Another disadvantage relates to the use of operating mechanisms which use a roller and track mechanism or sleeve type bearings to operate the torsional structure. The torsional structure is usually hinged to the wall of the trailer and if the operating mechanism on the front wall and side wall do not stay perpendicular, premature failure of the bearings will occur due to misalignment.

An additional need is to be able to rotate the tarping system to either one side or the other of the trailer, which is partially addressed by U.S. Pat. No. 6,983,975. However, said patent does not provide a tarping system which is capable of handling multiple widths and lengths of trailers without the need for different parts or the welding of components that have been cut to length.

The tarping system of the present invention addresses these and other problems in the art.

BRIEF SUMMARY OF THE INVENTION

The present invention provides a covering system comprising a cover pivotable between a generally horizontal covered position adapted to cover an open top container and an uncovered position adapted to allow access to the open top, and an improved drive mechanism for opening and closing the cover.

BRIEF DESCRIPTION OF THE SEVERAL VIEWS OF THE DRAWINGS

FIG. 2D is similar to FIG. 2C and shows the cable having been tightened to move the frame assemblies toward one another and into square.

FIG. 3 is a front elevational view taken on line 3-3 of FIG. 2A showing the front of the tarping system and upper portion of the trailer.

FIG. 4 is an enlarged front elevational view of the width adjustment mechanism shown in FIG. 3.

FIG. 6 is an enlarged side elevational view taken on line 6-6 of FIG. 2A.

FIG. 7 is an enlarged side elevational view from the opposite direction of FIG. 6 taken on line 7-7 of FIG. 2A.

FIG. 23 is similar to FIG. 22 and shows the tarp assemblies in a process of opening.

Similar numbers refer to similar parts throughout the drawings.

DETAILED DESCRIPTION OF THE INVENTION

Figure 1:
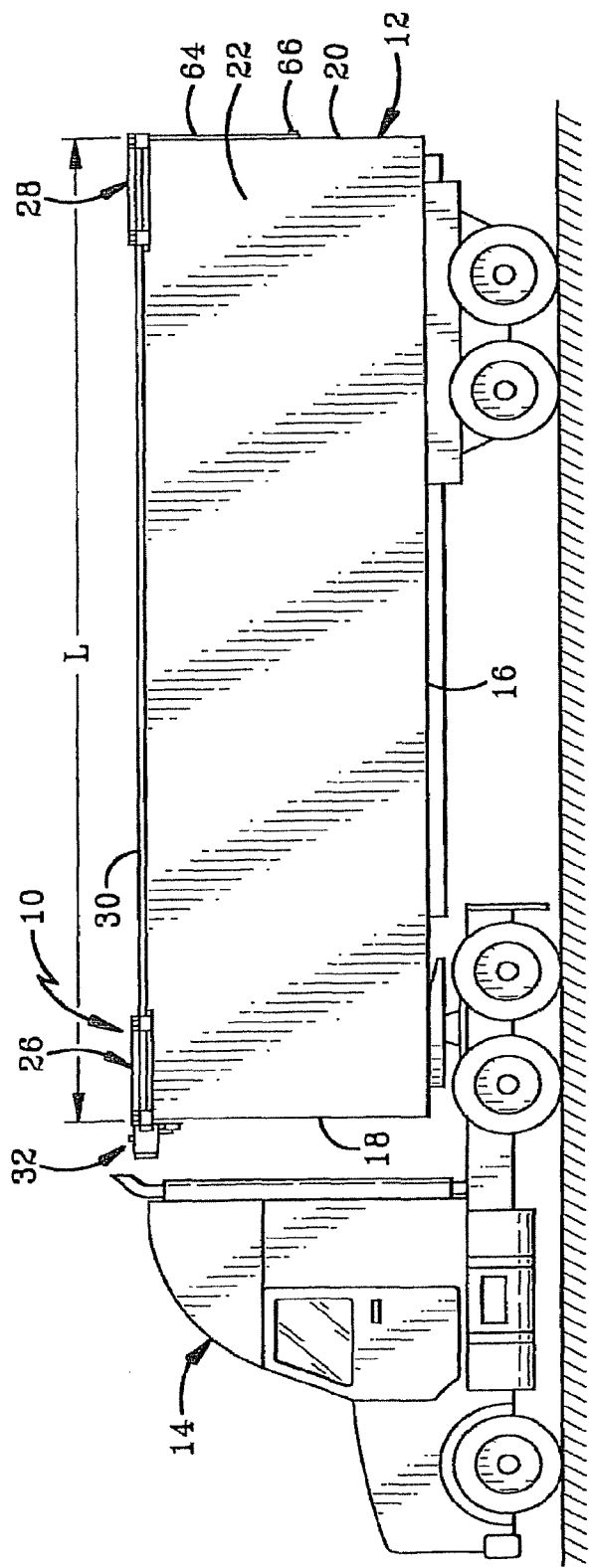
FIG. 1 is a side elevational view of a truck and trailer with which the first embodiment of the tarping system of the present invention is used.
Figure 21:
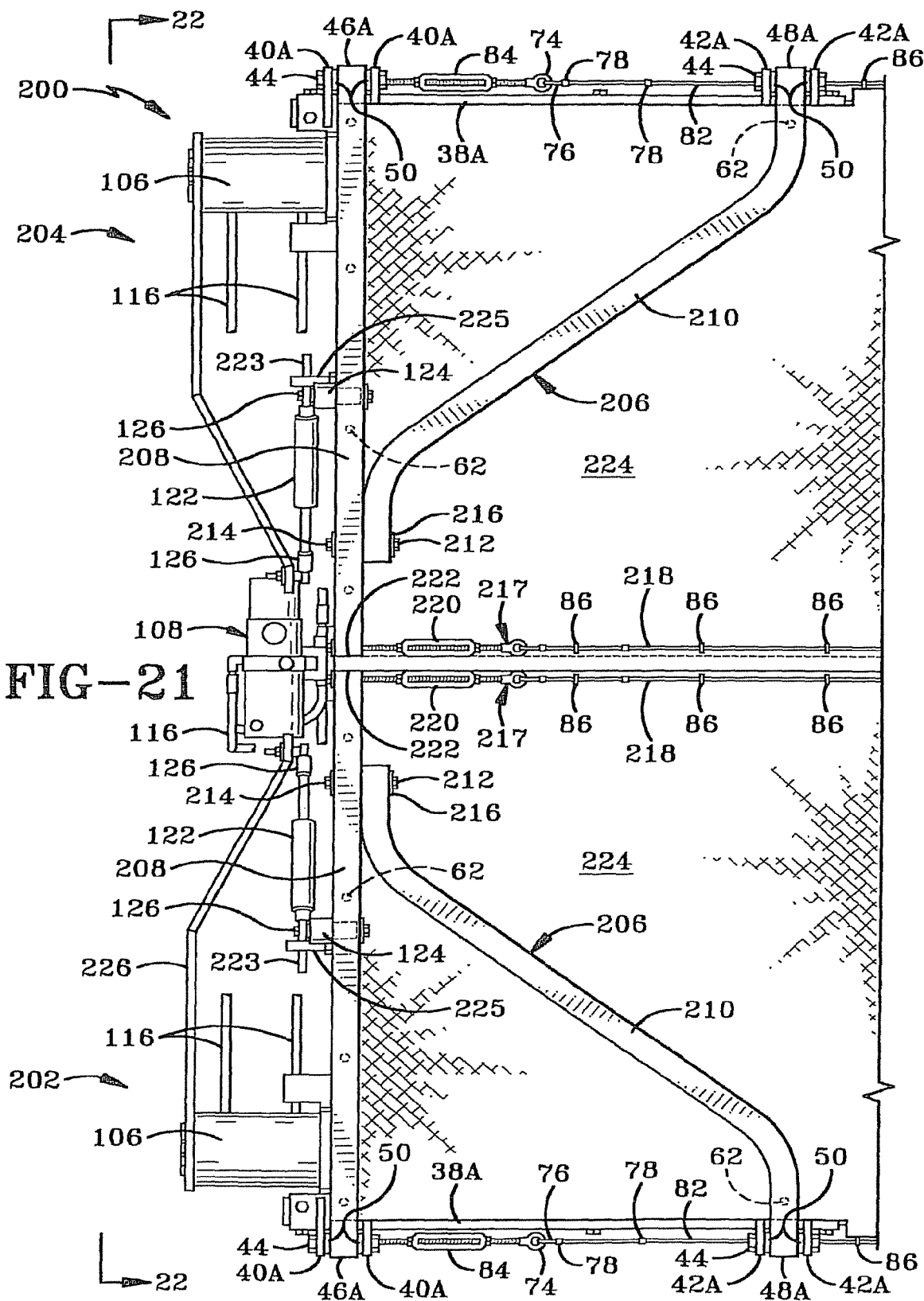
FIG. 21 is a top plan view of a front portion of a second embodiment of the tarping system of the present invention showing two tarp assemblies each covering a portion of the trailer.
Figure 22:
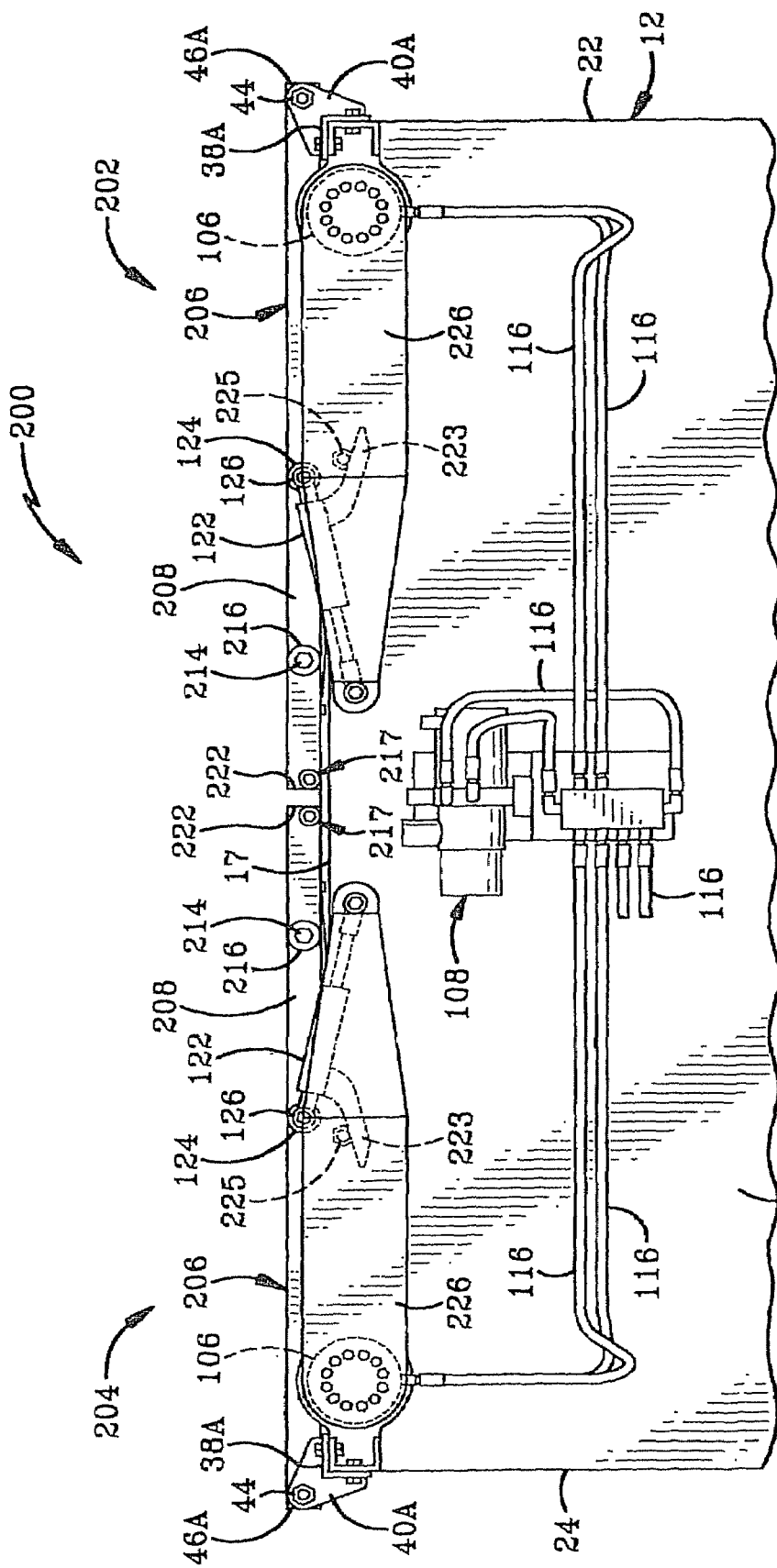
FIG. 22 is a front elevational view taken on line 22-22 of FIG. 21 showing the tarp assemblies in the covered position.

A first embodiment of the tarping system of the present invention is indicated generally at 10 in FIG. 1, and a second embodiment is indicated generally at 200 in FIGS. 21-23. System 10 is shown atop an open top trailer 12 which is towed by a truck 14. Tarping system 10 may be used equally well with railroad cars or any other open top container. Trailer 12 includes a bottom wall or floor 16 and front and rear walls 18 and 20 extending upwardly therefrom and defining therebetween a longitudinal direction and length of trailer 12 each of which is represented at L in FIG. 1. Trailer 12 further comprises first and second side walls 22 and 24 extending upwardly from floor 16 and defining therebetween an axial direction of trailer 12. Rear wall 20 is typically in the form of a tailgate which is pivotally mounted to one of the sidewalls 22 and 24 and latched to the other of the sidewalls 22 and 24. Alternatively, the tailgate may be pivotally mounted adjacent its top in order to flip open during the dumping of material from within trailer 12. The longitudinal and axial directions of trailer 12 will likewise be applied to tarping system 10 to simplify the description. Trailer 12 has a top 17 (FIGS. 3-4) and defines an interior chamber 25 (FIG. 2A) which is bounded by front wall 18, rear wall 20, side walls 22 and 24 and floor 16, and which extends from floor 16 to top 17.

System 10 includes front and rear substantially rigid frame assemblies 26 and 28 which are pivotally mounted on first side wall 22. A flipper assembly 32 is mounted on front wall 18 of trailer 12 for flipping the support assembly and the tarpaulin 30 between covered and uncovered positions. A tarpaulin 30 may be mounted on first and second assemblies 26 and 28, which serve as supports or part of the support assembly for tarpaulin 30. Alternatively, tarpaulin 30 may not be mounted to the first and second assemblies 26 and 28, as detailed further below. Tarpaulin 30 is sized to completely cover the top of trailer 12 and may hang over the top edges thereof in some areas. Tarpaulin 30 may be formed of any material suitable for covering such an open top container. The tarpaulin 30 may be any suitable sheet material, including but not limited to, materials such as canvas, woven materials, mesh materials, expanded metal, plastic sheeting or meshes, plastic coated woven materials. As will be appreciated, mesh material may be preferable for some situations especially in that it limits the effects of winds both when opening the tarp and also during travel. Solid materials may be preferable for better excluding water from the load being covered.

Figure 2:
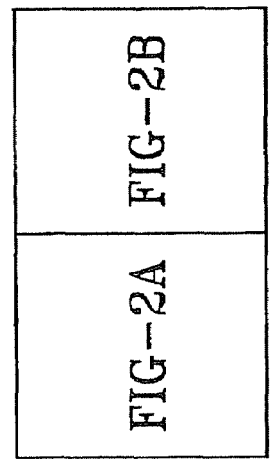
FIG. 2 is a diagrammatical view showing the relation between FIGS. 2A and 2B.
Figure 2A:
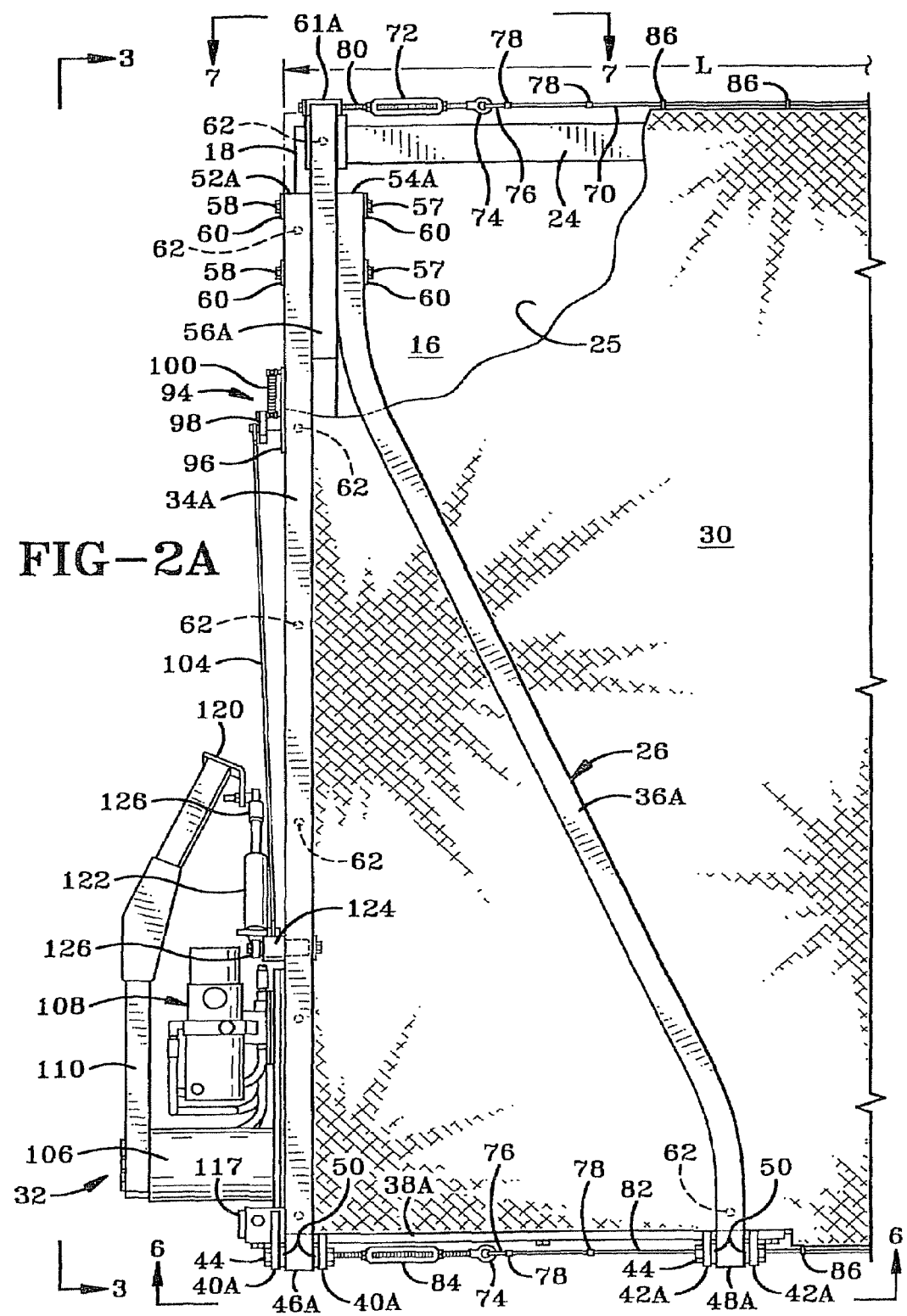
FIG. 2A is a top plan view of a front portion of the tarping system.

Referring to FIG. 2A, first frame assembly 26 is a generally triangular structure which includes a straight first beam 34A and a second beam 36A having a straight central section and end portions which are joined to the central section by segments which are curved in opposite directions so that the end portions are substantially parallel. Assembly 26 further includes a base 38A in the form of an angle which is mounted at the top of first side wall 22 adjacent to and overhanging front wall 18 of trailer 12. Beams 34A and 36A are pivotally mounted on base 38A about longitudinally extending axis which is generally parallel to side wall 22. Base 38A is preferably removably mounted on side wall 22 such as by plurality of bolts or the like so that assembly 26 may be removed for use with another trailer or so that it may be positioned on the other side wall 24 if desired. A first set of spaced ears 40A is mounted on base 38A and extends outwardly therefrom adjacent front wall 18 and a second set of spaced ears 42A extends outwardly from base 38A adjacent its rear end. Respective bolts 44 extend through hole formed in ears 40A and 42A and serve as pivots on which first and second beams 34A and 36A are pivotally mounted adjacent respective first ends 46A and 48A thereof. Beams 34A and 36A typically include cylindrical tubes at their respective first ends 46A and 48A in which are preferably disposed bearings 50 and through which bolts 44 extend whereby bearings 50 facilitate rotational movement of assembly 26. Grease ports are typically provided for lubricating bearings 50. Beams 34A and 36A have respective second ends 52A and 54A adjacent which a short third beam 56A is mounted between beams 34 and 36 via bolts 58, nuts 57 and fender washers 60 which are used to spread the force applied by bolt 58 to the preferably hollow beams 34A, 36A and 56A. A plurality of axially spaced holes 59 (FIG. 3) are formed through third beam 56A for receiving therethrough bolts 58 and allowing for axial adjustment of beam 56A to selectively provide different axial widths of assembly 26 as shown in FIG. 4, thus providing a width adjustment mechanism to accommodate trailers of different widths. An end member 61A is connected to and extends downwardly from the outer end of beam 56A.

Figure 2B:
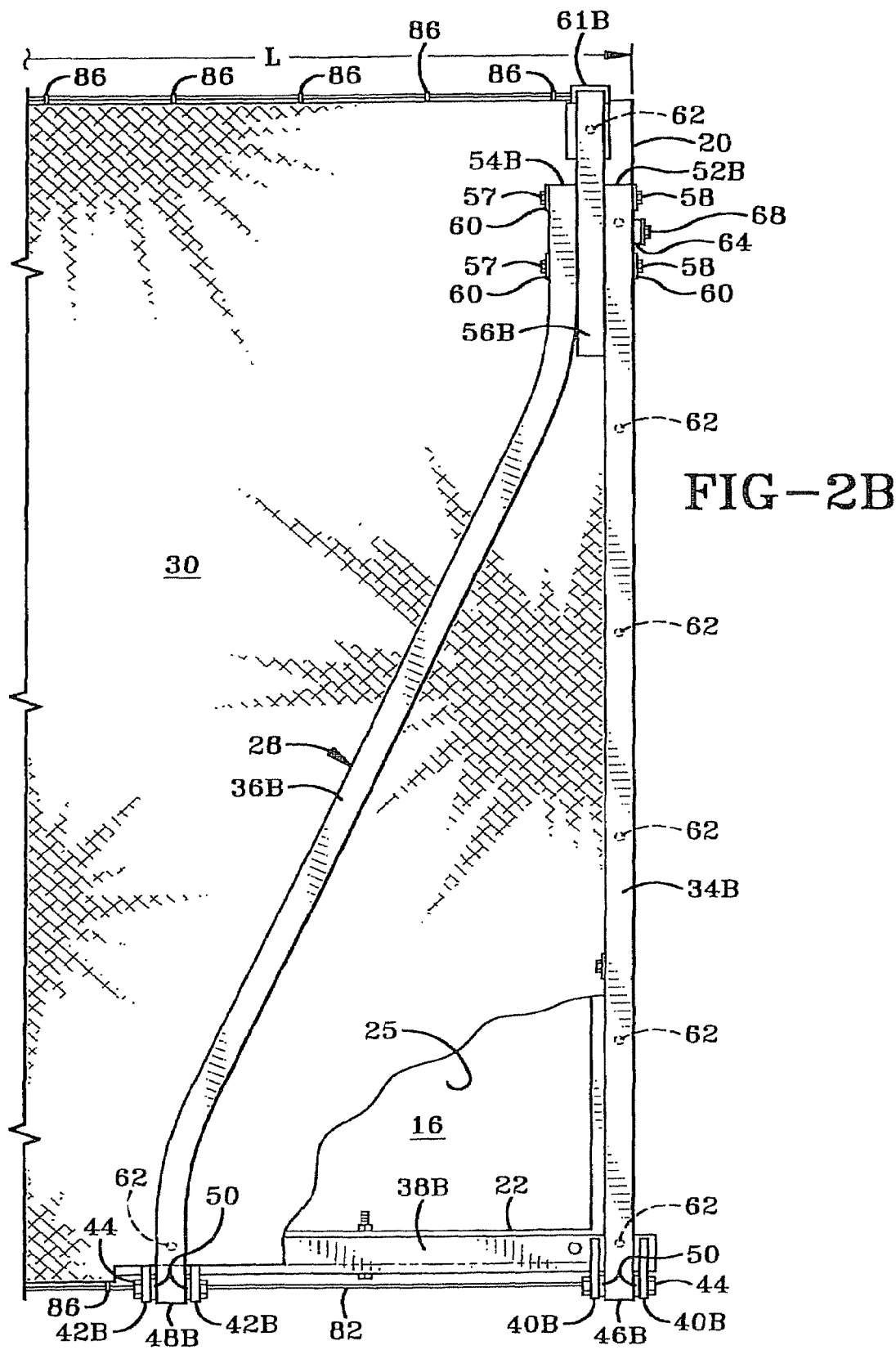
FIG. 2B is a top plan view of a rear portion of the tarping system.

Referring to FIG. 2B, second frame assembly 28 has a generally triangular configuration and is substantially a mirror image of first frame assembly 26. Thus, assembly 28 includes the same members as assembly 26 as described thus far so that second assembly 28 will not be described in further detail except to indicate that various of the numbered elements of assembly 26 which end in letter A are represented by analogous elements ending in the letter B in assembly 28, such as first beam 34A in assembly 26 and the first beam 34B in assembly 28. Tarpaulin 30 may be connected to assemblies 26 and 28 by plurality of fasteners 62 which may take various forms, such as snaps, screws, bolts, zip ties and so forth. Although assembly 28 is substantially a mirror image of assembly 26, one exception is the connection of a tie down member 64 which is typically in the form of a strap, rope or other flexible elongated member suitable for manually tying down assembly 28 to trailer 12 via a tied down mount 66 (FIG. 1) mounted on rear wall 20 of trailer 12. Tie down member 64 is connected to first beam 34B adjacent second end 52B thereof via a bolt 68 and associated washer or other suitable mechanisms. Other suitable latching mechanisms may also be used, such as a spring actuated hook similar to latch assembly 94. This latching mechanism may be opened manually by a rope, cable or the like.

Overcoming one of the problems of certain prior art tarping systems, first and second assemblies 26 and 28 are preferably not coupled to one another by a torsional member. However, assemblies 26 and 28 are connected to one another by an linearly elongated member which is generally and torsionally flexible shown in the form of a cable 70 which is typically under tension when the tarpaulin support assembly is assembled. However, depending on the specific size and configuration of the tarping system, cable 70 may not be under initial tension in the covered position. A chain, a synthetic line or other suitable flexible member may be used instead of cable 70. A turnbuckle 72 (FIG. 2A) is provided for adjusting the tension of cable 70. Cable 70 adjacent its front end is connected to an eye bolt 74 of turnbuckle 72 via a thimble 76 looped through the eye bolt and a pair of cable clamps 78 for clamping a folded portion of cable 70 to itself. A second threaded bolt 80 of turnbuckle 72 extends through a hole formed in end member 61A to connect turnbuckle 72 thereto. Adjacent its rear end, cable 70 is connected to end member 61B in any suitable fashion, such as an eye bolt with a thimble and cable clamps as previously noted. Thus, end members 61A and 61B serve as cable mounting members and more particularly provide for the mounting of cable 70 below the lower surface of the horizontal structures of frame assemblies 26 and 28. Thus, cable 70 extends laterally in the longitudinal direction external to trailer 12 adjacent second side wall 24 and preferably below top 17 of the container. This position of cable 70 allows the length of tarp 30 along side wall 24 to extend downwardly below top 17 and more particularly to be stretched over the intersection of top 17 and side wall 24 to provide a better seal with top 17 to help reduce spaces through which material from the load inside trailer 12 can be blown out.

Referring to FIGS. 2A and 2B, another flexible member in the form of a cable 82 is connected to ears 40B at the rear of trailer 12 and extends forward to and is connected to an eye bolt of another turnbuckle 84 as previously described with regard to turnbuckle 72 and cable 70. More particularly, cable 82 extends through holes formed in ears 42A and 42B and may also pass through other support structures extending from side wall 22 so that cable 82 is preferably positioned below top 17 of trailer 12. Turnbuckle 84 is mounted on ears 40A adjacent front wall 18 of trailer 12. Tarp 30 is connected to cables 70 and 82 with a plurality of zip ties 86 which are longitudinally spaced from one another. As shown in FIGS. 6 and 7, zip ties 86 loop around cables 70 and 82 and also around turnbuckles 72 (FIG. 7). Zip ties 86 further loop through respective holes 88 formed in tarpaulin 30 along the respective edges thereof adjacent cables 70 and 82. Grommets are typically used to reinforce holes 88. The positioning of cable 82 below top 17 of trailer 12 allows top 30 to fold down over the top of side wall 22 similar to the opposite side to provide a better seal. Alternately, tarp 30 may be connected to first side wall 22 by various types of connectors instead of being mounted on a cable such as cable 82. Moreover, tarpaulin 30 may be mounted only on cable 70 and cable 82, or only on cable 70 and side wall 22 instead of cable 82. That is, tarpaulin 30 may not be connected to frame assemblies 26 and 28, as previously noted.

Figure 2C:
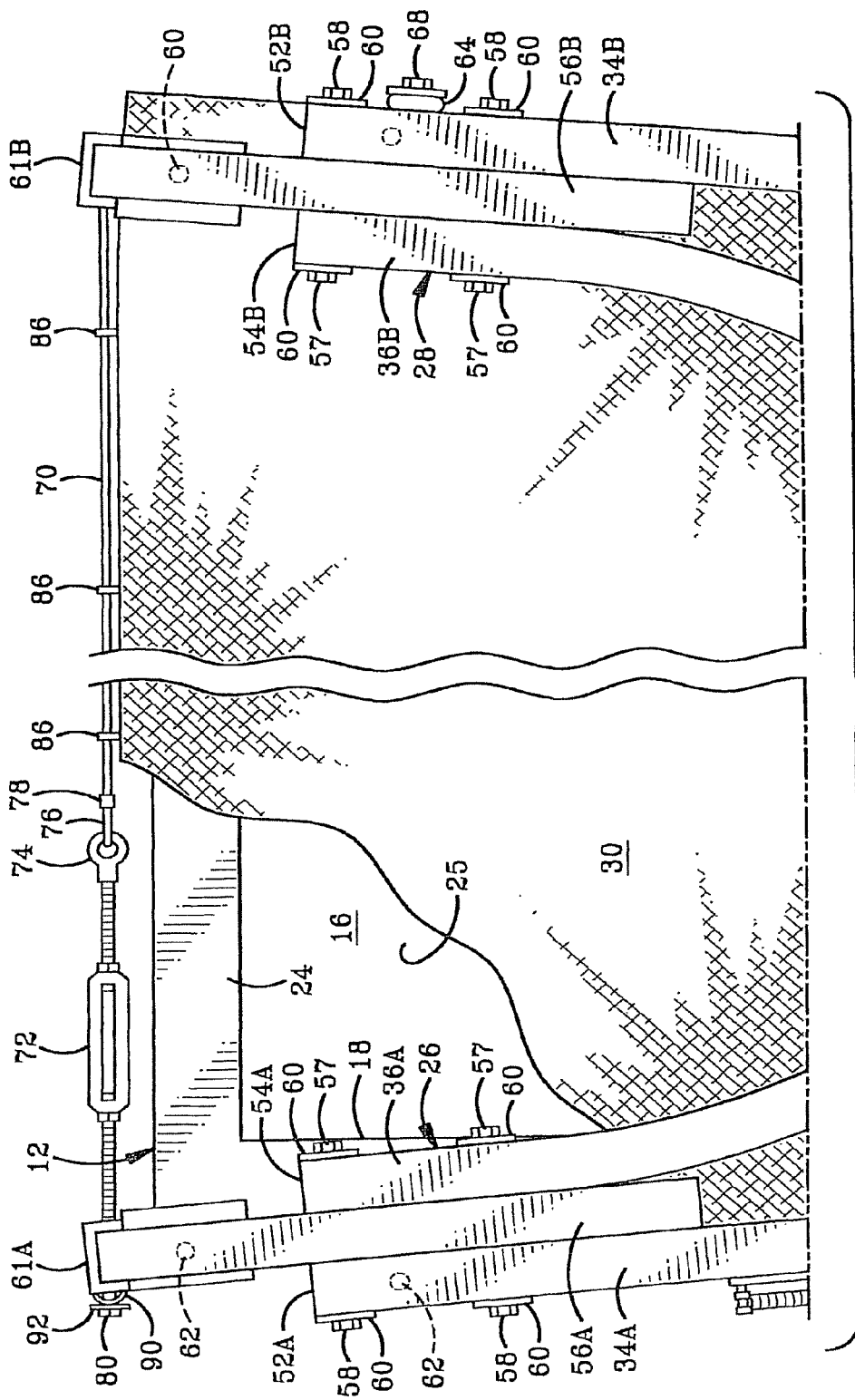
FIG. 2C is an enlarged top plan view with portions cut away showing the ends of the frame assemblies distal their pivotal mounts and showing the frame assemblies out of square prior to the tightening of the cable extending therebetween.

Referring to FIGS. 2C and 2D, some steps of assembling the support assembly of floor tarpaulin 30 are described. Once each base 38 of assembly 26 and 28 is mounted on trailer 12 to fix the position of base 38A and base 38B with respect to one another, cable 70 may be tightened with the use of turnbuckle 72 to apply the appropriate amount of tension thereto. FIG. 2C shows the outer ends of assemblies 26 and 28 prior to the tightening of cable 70 and FIG. 2D shows cable 70 in the tightened position. Depending on the size of tarp 30 and other factors, the tension of cable 70 will vary. Typically, cable 70 is under a tension of somewhere in the range 300 pounds, and more broadly between 100 pounds and 1000 pounds. As FIG. 2C shows, the straight beams 34 and 56 of each assembly 26 and 28 are out of square with one another prior to the tightening of cable 70. As turnbuckle 72 is rotated (Arrow A) to tighten cable 70 to the final position shown in FIG. 2D, the outer ends of assemblies 26 and 28 are deflected toward one another as indicated as arrows C in order to bring beams 34 and 56 of assemblies 26 and 28 into square or to make them substantially parallel to one another and to front and rear walls 18 and 20 of trailer 12. To simplify the task of setting the tension on cable 70, a tension indicator is provided by the use of a spring washer 90 and a flat washer 92 mounted on bolt 80 so that spring washer 90 is disposed between flat washer 92 and end member 61A. In FIG. 2C, spring washer 90 is shown at rest in an expanded position in which it has not yet been compressed. FIG. 2D shows that as turnbuckle 72 is tightened, spring washer 90 moves (Arrow B) to a compressed or flat state or position. The movement of spring washer 90 to this flat or compressed state during the tightening of cable 70 via turnbuckle 72 indicates that cable 70 has reached the approximate degree of tension desired. Alternatively, a compression spring may be used in place of spring washer 90.

With reference to FIGS. 2A, 3 and 4, a securing mechanism in the form of a latch assembly 94 for securing frame assembly 26 to front wall 18 of trailer 12 is described. Assembly 94 includes a mounting plate 96 mounted on the front side of beam 34A, a latch 98 pivotally mounted on mounting plate 96 and a spring 100 which biases latch 98 toward a secured position in engagement with a catch 102 mounted on front wall 18 of trailer 12. Spring 100 extends between and is connected to each of mounting plate 96 and latch 98. A release cable 104 or other elongated member is connected adjacent one end thereof to latch 98 and forms part of a release mechanism for automatically releasing latch 98 to allow tarp 30 and its support assembly to move out of the covered position.

Figure 5:
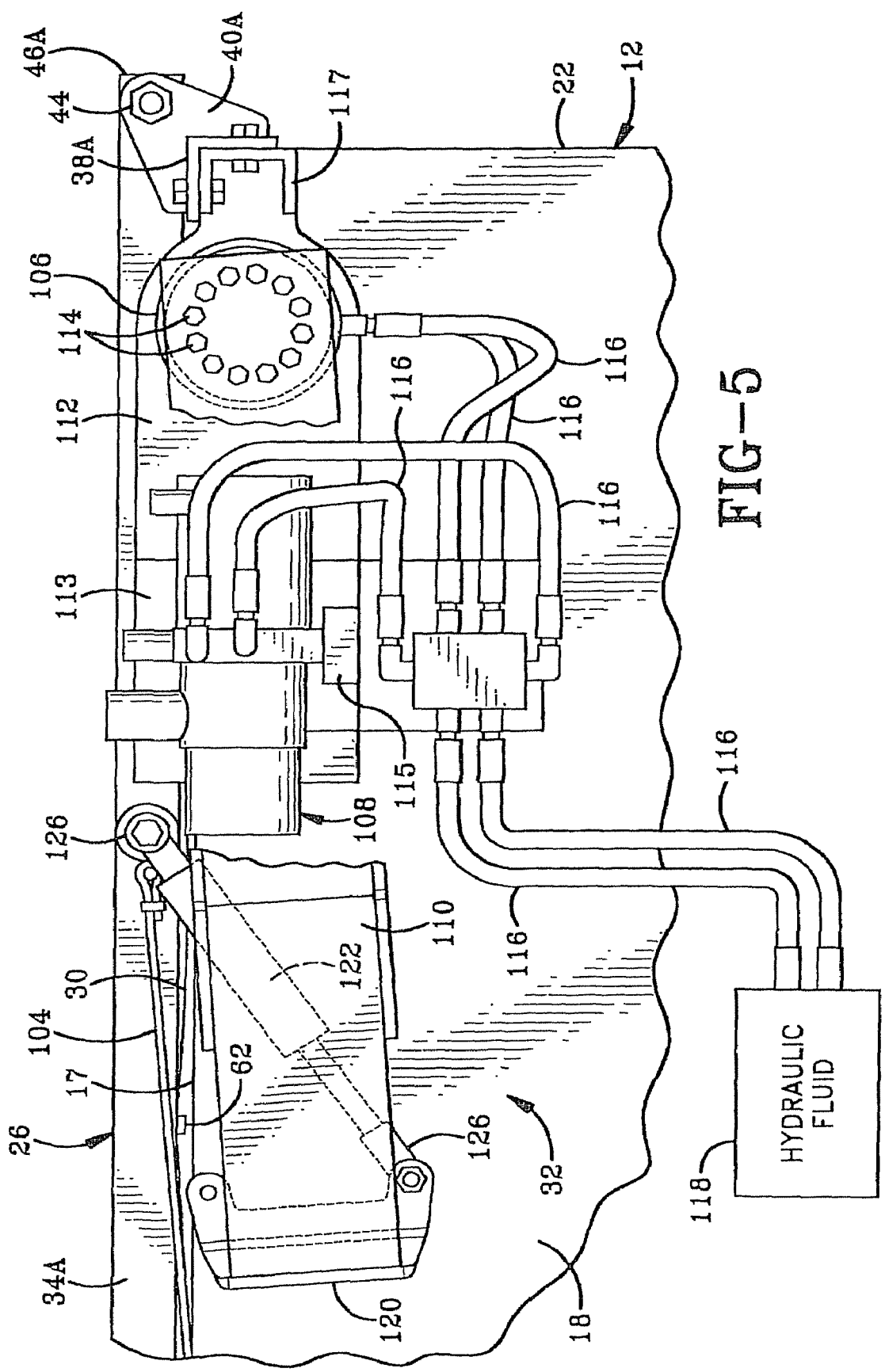
FIG. 5 is an enlarged front elevational view of the actuating mechanism shown in FIG. 4 along with the hydraulic connections.

With reference to FIGS. 2A, 3 and 5, flipper assembly 32 is described in greater detail. Assembly 32 includes a rotary actuator 106 which is hydraulically powered by a hydraulic power pack 108 and on which is mounted a drive arm 110 which is rotatably driven by actuator 106 about a longitudinally extending axis which is substantially parallel to and offset from the axis about which assemblies 26 and 28 pivot.

Drive arm 112 is spaced forward of power pack 108 at about the same height and thus protects power pack 108 from branches and the like during travel. Actuator 106 is secured to a mounting member in the form of a mounting plate 112 which is secured to front wall 18 of trailer 12. Arm 110 is secured to the drive shaft of actuator 106 via a plurality of bolts 114 arranged in a circular pattern. Although not shown, an inner and an outer ring are disposed within the hollow interior of arm 110 respectively inside of and outside of the circular pattern of bolts 114 to serve as spacers which provide strength to the connection between the arm 110 and actuator 106 and assist in translating torque therebetween. Feed and return hydraulic lines 116 are suitably connected between actuator 106, power pack 108 and a hydraulic tank 118.

A first portion of arm 110 extends substantially parallel to front wall 18 and a second portion angles inwardly toward wall 18 to a free end thereof on which is mounted a cap plate 120. A link 122 is mounted at one of its ends to cap plate 120 and at its opposite end to a boss 124 mounted on beam 34A. Boss 124 extends into the interior chamber of hollow beam 34A and abuts the inner surface of the rear wall thereof to reinforce the connection when bolted onto beam 34A. Preferably, each end of link 122 is connected respectively to plate 120 and boss 124 by ball and socket connections 126 or other pivotal connections which allow for pivotal movement in multiple directions. In the exemplary embodiment, link 122 includes a pair of substantially spherical members at each end to provide this pivotal connection. However, other suitable pivotal connections may be used. Preferably, each pivotal connection 126 provides at least two degrees of freedom. Release cable 104 at one end thereof is connected to link 122 at a location adjacent its connection to boss 124 but spaced radially outwardly therefrom a suitable distance for pulling cable 104 to provide the release mechanism as described further below.

In the exemplary embodiment, link 122 is an extendable retractable assembly and in particular is shown as a piston cylinder combination providing linear extension and retraction. Depending on the specific embodiment, link 122 need not be extendable and retractable. This extendable aspect of link 122 allows drive arm 110 to pivot from its position shown at FIG. 3, in which it is over center with respect to pivotal connection 126 at boss 124 there below, to subsequent positions in which it is over center in the opposite direction with respect to pivotal connection 126 at boss 124. Thus, drive arm 110 may be disposed below the upper surface of frame assembly 26 in the covered position so that arm 110 does not add to the height of the trailer. When height limitations are not at issue, drive arm 110 may be disposed upwardly of assembly 26 in the covered position and thus not need a link such as link 122 which provides extension and retraction. In another embodiment, the pivots may be configured such that link 122 drives frame assembly 26 upward from below. When the frame assembly rotates to its fully open position along the first side wall 22, the extension capability of link 122 allows the drive arm 110 to pass the frame assembly 26 and store inward of such frame assembly 26 such that the overall width of the trailer 12 is minimized.

Power pack 108 is mounted on mounting plate 112 by another mounting plate 113 secured thereto and a support arm 115 which extends outwardly in the forward direction from mounting plate 113. Another support arm in the form a channel 117 is connected to and extends forward from mounting plate 112 adjacent first side wall 22. Channel 117 includes an angle which is matingly connected to the overhanging portion of base 38A by a pair of bolts to provide additional strength between plate 112 and base 38A.

Flipper assembly 32 thus provides a 4-bar linkage in which the four arms are drive arm 110, link 122, beam 34A of assembly 26 and the body of trailer 12 when mounted thereon. Alternately, the fourth arm may be made up of mounting plate 112, channel 117 and base 38A via the connection between. The use of this 4-bar linkage with rotary actuator 106 or another rotational drive eliminates the need for rollers mounted on a link which rollably engage another link typically within a track. This also eliminates the need for a slidable/pivotal connection, such as a projection on a link which pivots and slides within a slot, track, passage or the like. In addition, the use of pivotal connections 126 on link 122 provides an advantage in that any stress which may have been induced into flipper assembly 32 as a result of deflection between front wall 18 and side wall 22 is eliminated because pivotal connections 126 do not allow transfer of any forces other than the axial force along link 122.

Figure 8:
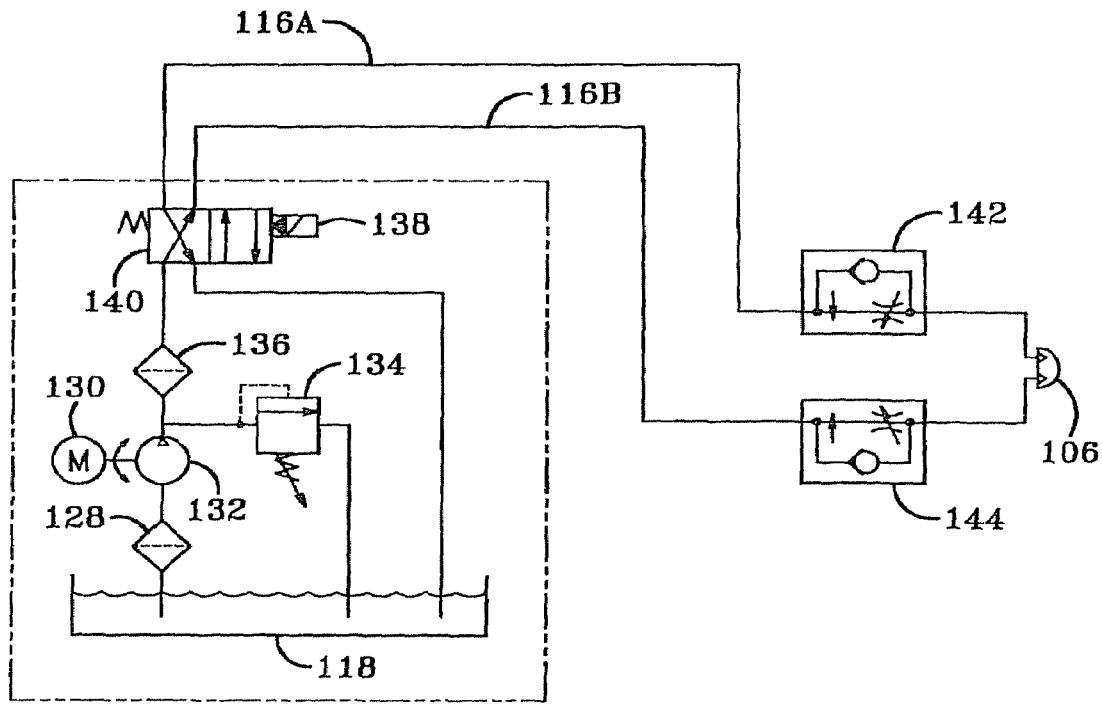
FIG. 8 is a schematic view of the hydraulic circuits of the tarping system.

Referring to FIG. 8, the hydraulic controls are described. Power pack 55 includes a tank such as tank 118 which may be part of the hydraulic system of truck 14 or may be separate. Power pack 55 further includes a suction strainer 128, an electric motor 130 that drives a hydraulic pump 132, a relief valve 134, a pressure filter 136 and a solenoid 138 operated directional control valve 140. A pair of hydraulic lines 116 which are indicated at 116A and 116B in FIG. 8 are connected to control valve 140. A pair of flow control valves 142 and 144 communicate with lines 116A and 116B along the hydraulic path to rotary actuator 106. Alternately, on trucks 14 that have hydraulic power, a splitter valve and separate control valve may be used instead of the hydraulic power pack 55.

Figure 9:
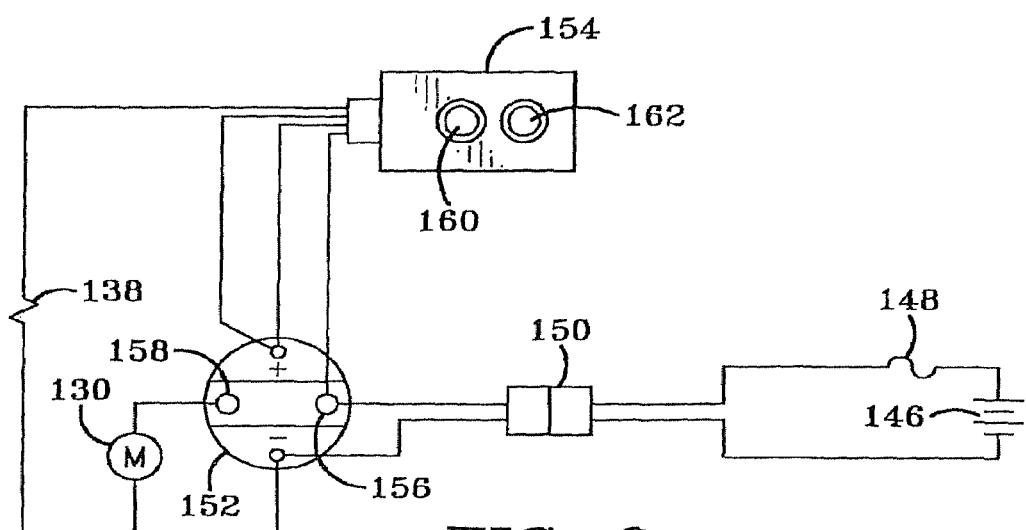
FIG. 9 is a schematic view of the electrical system of the tarping system.

Referring to FIG. 9, the electrical controls are detailed. Electrical power is provided by a battery 146 of tractor 14 or the like. A circuit breaker 148 is connected to a positive terminal of battery 146. Wires run from both the positive and negative terminals to a connector 150 which allows tractor 14 to be disconnected from trailer 12. From connector 150, the negative side is connected to motor 130, valve solenoid 138 and the negative terminal of motor solenoid 152. The positive side is connected to a switch box 154 and a first terminal 156 of motor solenoid 152. A second terminal 158 of motor solenoid 152 is connected to motor 130. Switch box 154 is also connected to the positive terminal of motor solenoid 152 and valve solenoid 138. Switch box 154 includes an open button 160 or switch and a closed button 162 or switch associated with opening and closing the tarping system.

Figure 10:
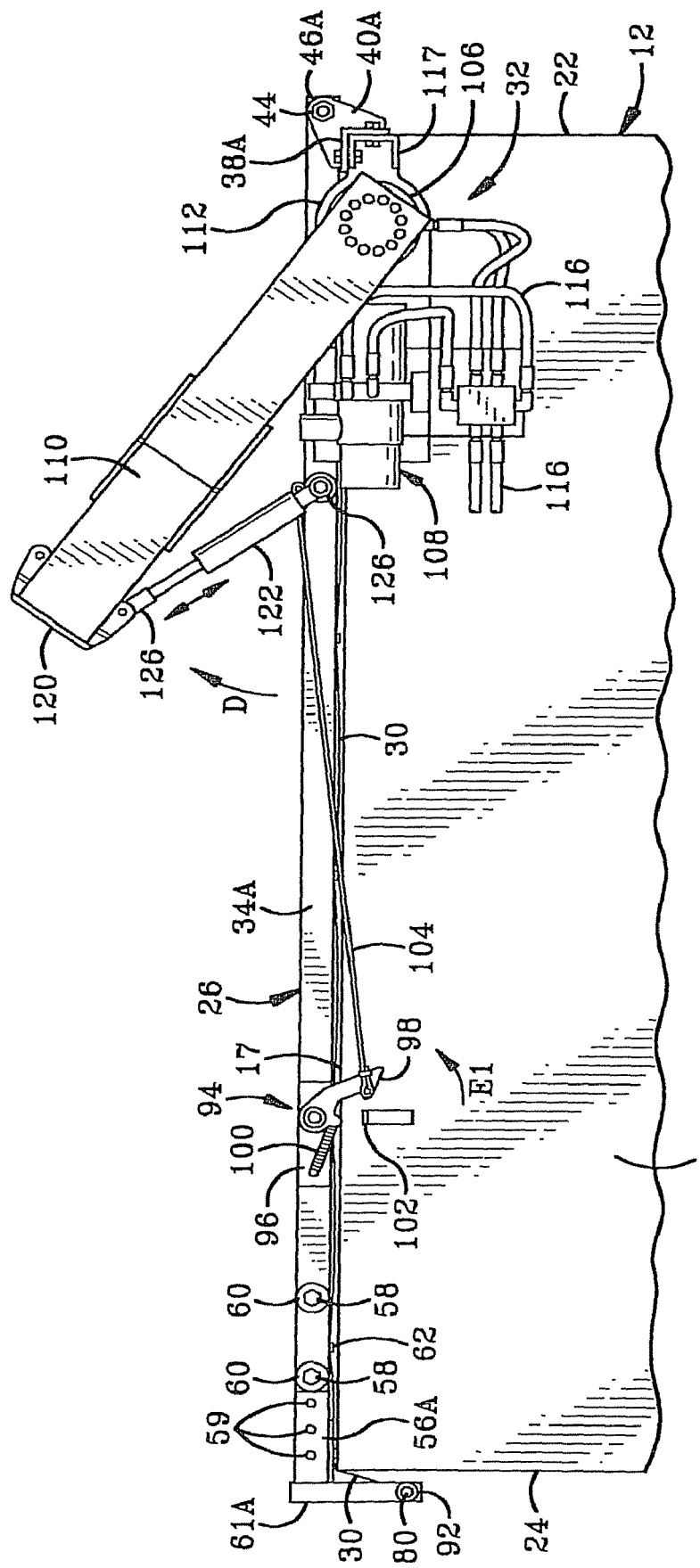
FIG. 10 is a front elevational view similar to FIG. 3 showing an initial stage of movement of the drive arm with the latch in the unlatched position.
Figure 16:
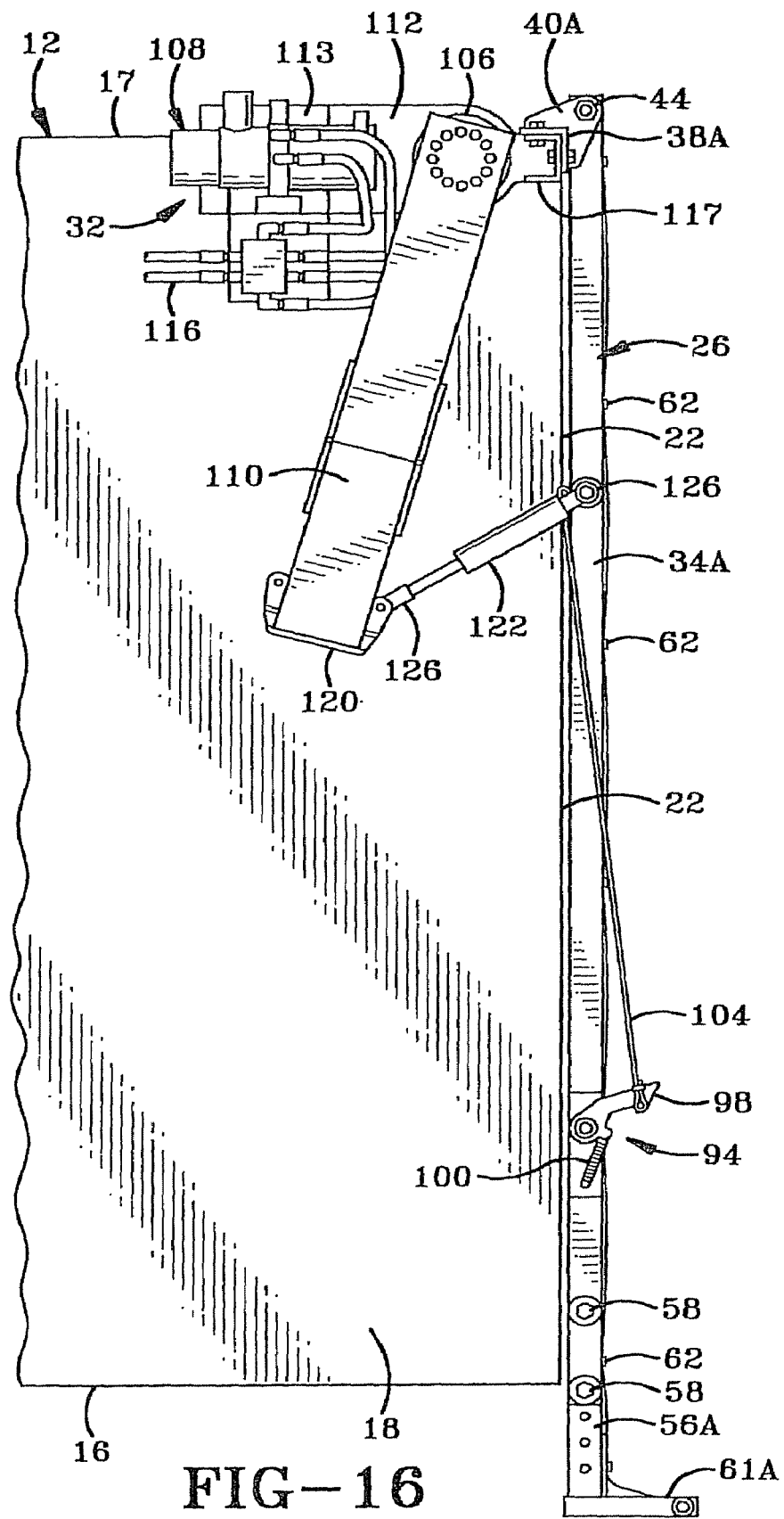
FIG. 16 is similar to FIG. 15 and shows the tarping system in the stowed position with both frame assemblies in a vertical position against the side wall of the trailer.

The opening of tarpaulin 30 and its support system from the covered position shown in FIG. 10 to the stowed position shown in FIG. 16 is hydraulically powered. Thus, the operation of the hydraulic system during opening is now described. Open button 160 of switch box 154 is actuated to energize electric motor 130 and solenoid 138. Motor 130 drives hydraulic pump 132 to draw hydraulic fluid from tank 118 through suction strainer 128 into pump 132 which pressurizes the fluid. Relief valve 134 limits the maximum hydraulic pressure typically to about 3000 psi. Fluid is pumped through pressure filter 136 and the flow thereof is diverted to line 116A because directional control valve 140 is activated. Fluid flows from line 116A to pressure compensated flow control valve 142 directly through a check valve thereof. Hydraulic fluid subsequently flows to actuator 106, causing it to rotate in an opening direction to move tarpaulin 30 from the uncovered position toward the stowed position, as discussed in greater detail below. Fluid from actuator 106 flows through pressure compensated flow control valve 144 which limits the flow to a setting thereof. Fluid continues through line 116B through directional control valve 140 and back to tank 118. Control valves 142 and 144 may be included as part of power pack 108 or may be replaced with other types of valves such as counter balance valves which would, like valves 142 and 144, control motion of the tarping system in an over center condition, and additionally would lock the tarping system in any position unless pressure and flow were provided to one side or other of rotary actuator 106. This is a particular advantage in locking the assembly 26 down to the top 17 of the trailer 12 during transport. Such counterbalance valve may be mounted directly to the rotary actuator 106.

To close or move the tarp system from the stowed position to the covered position, close button 162 of switch box 154 is actuated. Once again, motor 73 is energized so the hydraulic fluid is drawn from tank 118 through suction strainer 128 into pump 132 and through pressure filter 136 via relief valve 134. However, flow is diverted into line 116B because directional control valve 140 is deactivated. The flow of hydraulic fluid is thus reversed through control valve 144 to rotate actuator 106 in an opposite direction for closing the tarpaulin. Fluid continues from actuator 106 through control valve 144 which limits the flow, and then back through line 116A, through valve 140 and into tank 118. If it is desired to mount the tarping system to rotate from second side wall 24 of trailer 12, hydraulic lines 116A and 116B may be switched at directional control valve 140. This will allow for the opposite flow of hydraulic fluid through actuator 106 while the electrical connections remain the same so that open switch 160 will still open the tarp and close switch 162 will close the tarp.

Referring to FIG. 9, the operation of the electrical system is briefly described. When open button 160 is pushed or otherwise actuated, valve solenoid 138 and the positive terminal of motor solenoid 152 are energized. Energizing the positive terminal of motor solenoid 152 connects the positive of battery 146 from first terminal 156 to second terminal 158 to energize motor 130 for raising tarpaulin 30 from the top of trailer 12 away from the uncovered position and toward the stowed position. When the close switch 162 is energized only the positive terminal of motor solenoid 152 is energized; valve solenoid 138 is not energized. Energizing the positive terminal of motor solenoid 152 again connects the positive of battery 146 from first terminal 156 and second terminal 158 to energize motor 130 and thus close tarpaulin over 30 trailer 12.

The operation of tarping system 10 is furthered described with reference to FIGS. 10-16. The tie down member 64 is first released. When open switch 160 is activated, rotary actuator 106 rotates its drive shaft to rotate drive arm 110 therewith as indicated at arrow D in FIG. 10. Link 122 moves in response to the pivotal movement of drive arm 110, pivoting at its pivotal connections 126 with plate 120 and boss 124. The movement of link 122 causes the movement of release cable 104 to pivotally move latch 98 (Arrow E1) so that it overcomes the spring bias force of spring 100 and releases from catch 102. At this stage, tarpaulin 30 and its support assembly remain in the covered position, in which the members of assemblies 26 and 28 are substantially coplanar within a horizontal plane.

Figure 11:
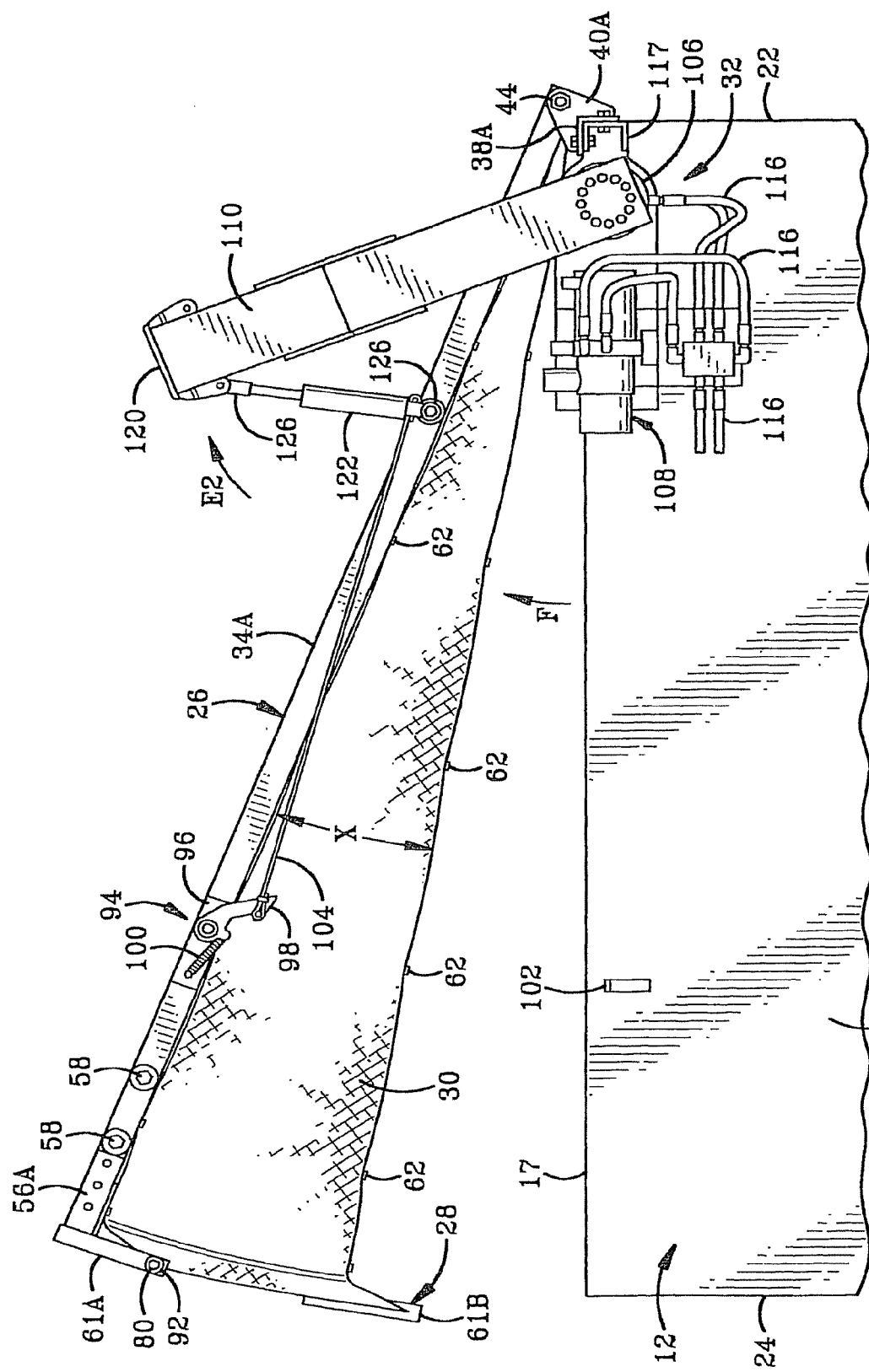
FIG. 11 is similar to FIG. 10 and shows a further stage of moving the tarping system to uncover the trailer with movement of the rear frame assembly trailing the movement of the front frame assembly.

FIG. 11 shows drive arm 110 rotated to a further degree in order to begin pivotally raising first frame assembly 26 (Arrow E2) via link 122. Initially, first frame assembly 26 is pivotally raised while second frame assembly 28 remains in abutment with the top of trailer 12. However, as frame assembly 26 continues its upward movement as shown in FIG. 11, it pulls second frame assembly 28 upwardly (Arrow F) via the connection of cable 70. Thus, the raising of second assembly 28 lags behind the raising of first frame assembly 26 and in the exemplary embodiment is driven only by the connection of the two frame assemblies by cable 70, the tension of which increases and thus also pulls second frame assembly 28 toward first frame assembly 26 to some degree during this movement. As shown in FIG. 11, the first and second frame assemblies 26 and 28 are circumferentially spaced from one another by an angle X which during the raising motion of tarpaulin 30 and the support assembly is at its greatest when second assembly 28 is on or closely adjacent top 17 of trailer 12. During this raising motion, angle X represents a rotational lag of second assembly 28 behind first assembly 26 which is due in part to the fact that first and second assemblies 26 and 28 are pivotable relative to one another. This rotational lag creates a substantially vertical component of the tension in cable 70 which must be great enough in order to provide a lifting force from first assembly 26 to second assembly 28 to pivotally move second assembly 28. Angle X also represents that assemblies 26 and 28 move out of the coplanar relationship of the covered position and remains in a non-coplanar configuration through most of the rotational movement between the covered and stowed positions.

In the exemplary embodiment, cable 70 transmits all of the force from first frame assembly 26 to second assembly 28 which is needed to move second assembly out of the horizontal covered position. Thus, the exemplary embodiment eliminates the need for torque tubes or any torsion bars or members for translating torque from assembly 26 to 28. The elimination of such torque tubes or other torsion members reduces the weight substantially especially where the container to be covered is fairly long. However, it is contemplated that other substantially rigid structural frame members may extend between and be connected to each of assemblies 26 and 28 without departing from the spirit of the invention. In any case, cable 70 will be needed in order to transfer sufficient force from assembly 26 to assembly 28 in order to move assembly 28 out of the covered position. However, the use of other members extending between the assemblies 26 and 28 may provide for some torque transmission, preferably without adding much weight to the tarp assembly. Cable 70 will provide a force transmitted from first assembly 26 to second assembly 28 to provide any amount of the torque about bolts 44 required to pivot assembly 28 out of the covered position. Most typically, cable 70 will provide such a transmitted force to provide at least fifty percent of the torque about bolts 44 required to pivot assembly 28 out of the covered position, although this number may be any percentage between fifty and one hundred percent in most instances. Most typically, cable 70 will limit angle X between assemblies 26 and 28 during lifting to 50 degrees or less. Depending on various factors such as the amount of initial tension on cable 70, the length and width of the tarp assembly, and the weight of second frame assembly 28, cable 70 may limit angle X to no more than 40 degrees, 30 degrees, 20 degrees or less.

Figure 12:
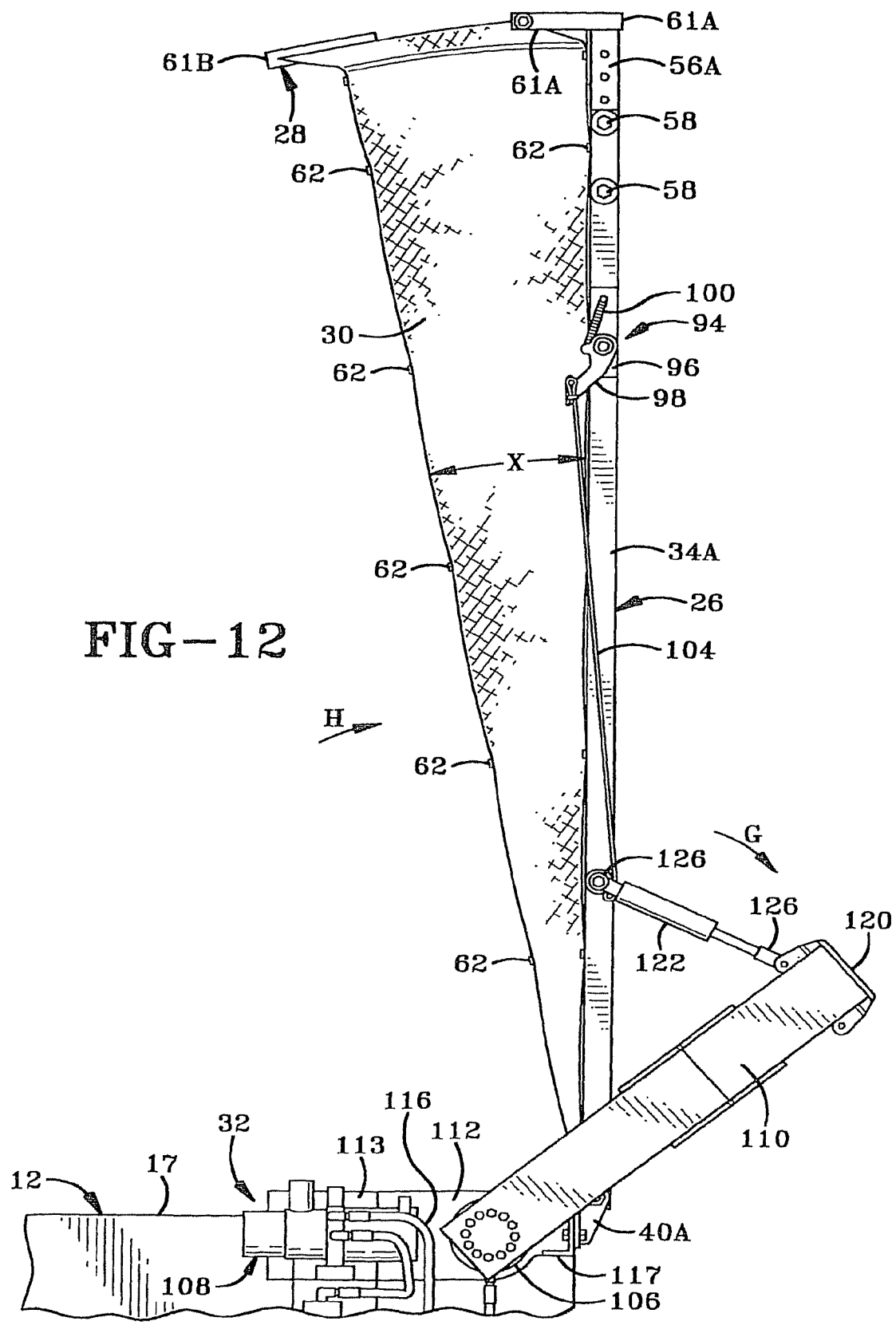
FIG. 12 is similar to FIG. 11 and shows a further stage of uncovering the trailer with the front frame assembly in a substantially vertical position.

FIG. 12 shows arm 110 having rotated to a further degree as indicated at arrow G so that beam 34A, beam 36A (not shown in FIG. 12) and beam 56A are in a vertical position while second frame assembly 28 has moved as indicated arrow H to a position in which the analogous members thereof are off vertical and still lag behind those of first frame assembly 26. Angle X at this stage is somewhat less than that in the earlier stages due to the fact that the amount of weight which must be supported by cable 70 at this point is reduced relative to the earlier stages.

Figure 13:
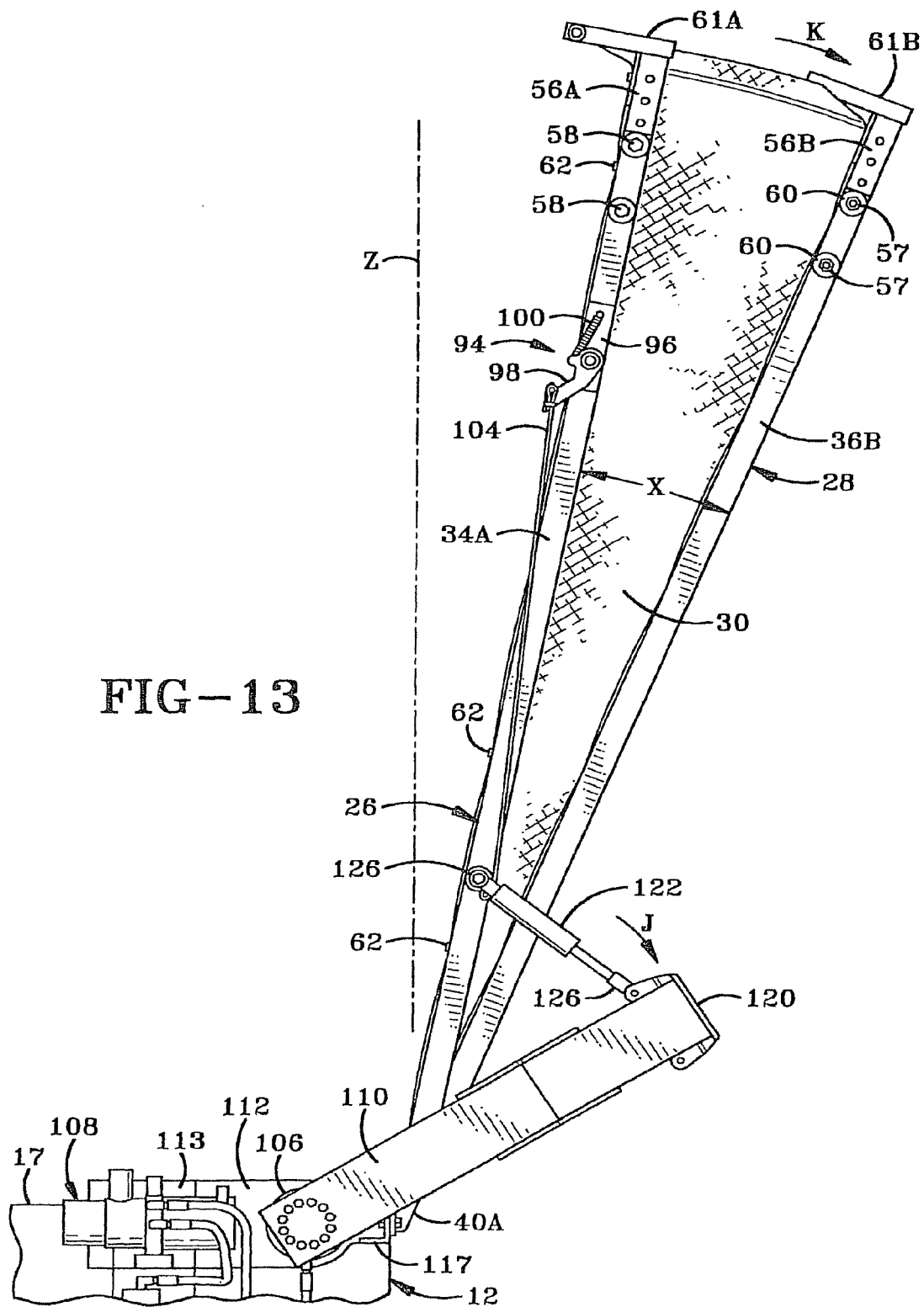
FIG. 13 is similar to FIG. 12 and shows a further stage of movement with the front frame assembly having moved past vertical and the rear frame assembly having swung forward of the front frame assembly.

FIG. 13 shows drive arm 110 having rotated to a further degree as indicated at arrow J so that first frame assembly 26 has moved past the vertical indicated by line Z to a degree which has allowed second frame assembly 28 to free fall as indicated at arrow K to a position ahead of first frame assembly 26. This free fall movement of assembly 28 is halted by its connection to first frame assembly 26 via cable 70. Angle X is similar to that of FIG. 12 although it will be slightly increased at this point. Hydraulic valving ensures that even when the tarp assembly goes over center, it does not cavitate the rotary actuator which would allow first frame assembly 26 to descend uncontrolled. Thus, other than the limited free fall motion of second assembly 28, and the limited free fall of first assembly 26 when link 122 moves from its extended position to its contracted position or vice versa, the flipping of tarp 30 and assemblies 26 and 28 is controlled throughout its movement.

Figure 14:
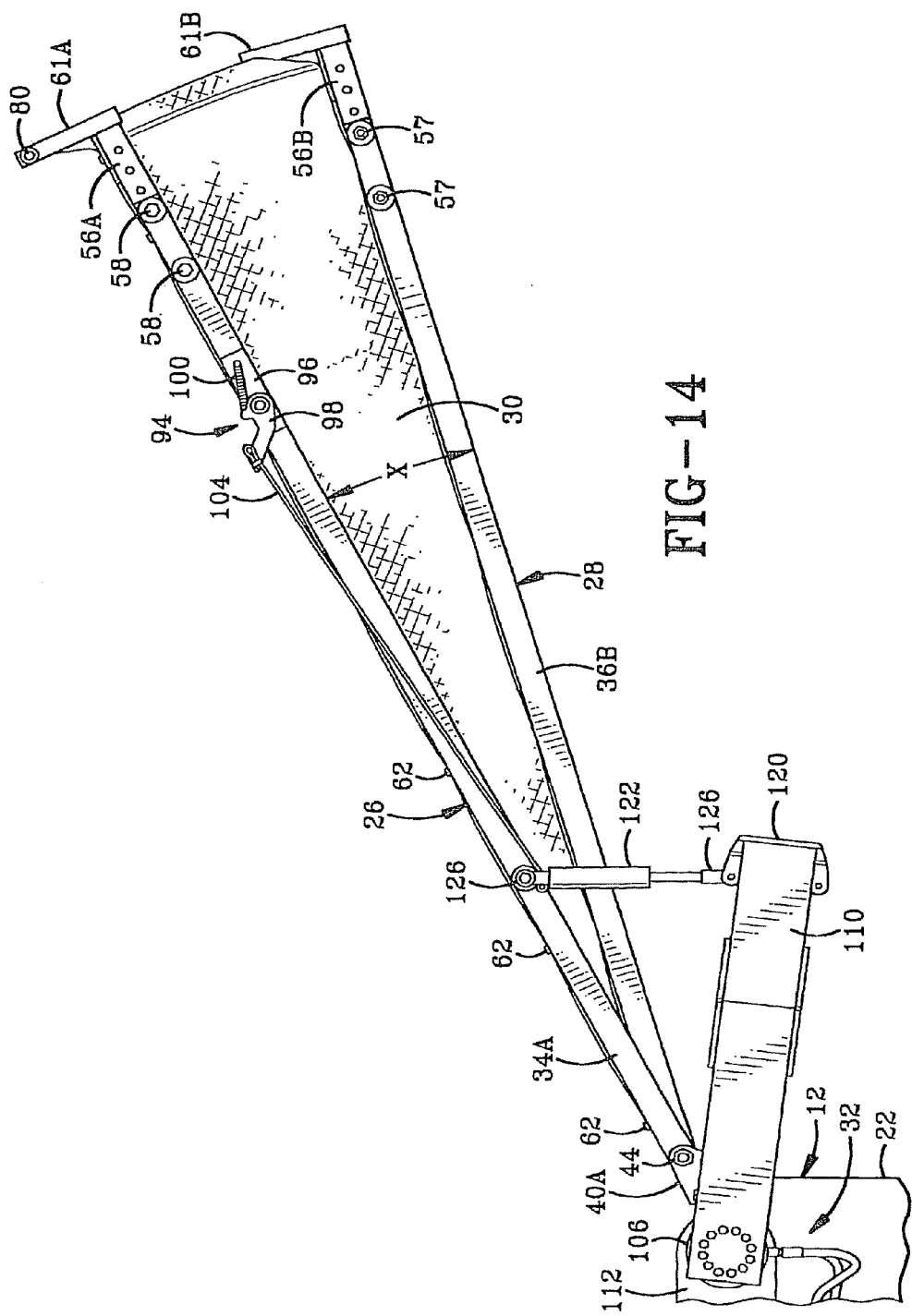
FIG. 14 is similar to FIG. 13 and shows a further stage of movement of the tarping system as it moves downwardly toward the stowed position.
Figure 15:
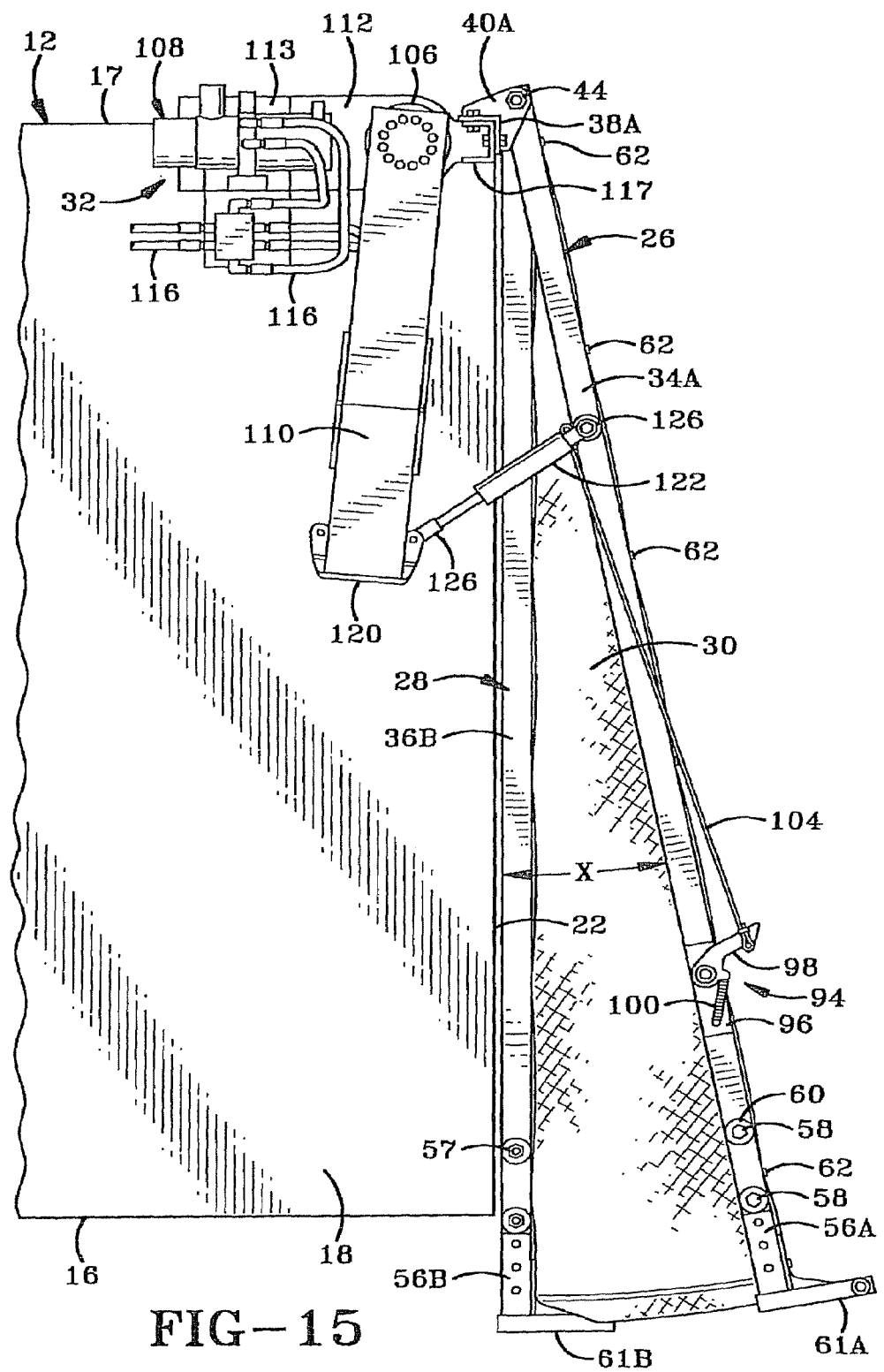
FIG. 15 is similar to FIG. 14 and shows the tarping system at a further stage of movement with the rear frame assembly in a vertical position beside the side wall of the trailer and the front frame assembly trailing the movement of the rear frame assembly.

FIG. 14 shows a further stage of rotation of arm 110 as support assemblies 26 and 28 and tarp 30 are further lowered and angle X becomes somewhat larger due to the amount of weight of assembly 28 which must be supported by cable 70. FIG. 15 shows second frame assembly 28 having reached a vertical location closely adjacent or in abutment with first wall 22 of trailer 12 while first frame assembly 26 remains angled outwardly as it lags behind with angle X being somewhat less than that shown in FIG. 14. FIG. 16 shows that both frame assemblies 26 and 28 and tarpaulin 30 has moved to the stowed position in a substantially vertical orientation beside first wall 22 of trailer 12. Trailer 12 at this position is suitable for tipping to unload and being loaded from first side 22 without further damage to tarping system 10 by loaders which may damage certain other prior art tarping systems as previously discussed.

To move tarp 30 and the associated assemblies from the stowed position to the covered position, close button 162 of switch box 154 is actuated as previously discussed. This would result in the rotational movement of assemblies 26 and 28 and tarp 30 in the opposite direction as illustrated in reverse order from FIG. 16 to FIG. 10 and subsequently to FIG. 3 in order to automatically reconnect latch assembly 94. During this reverse rotation, drive arm 110 would thus rotate to move first assembly 26 with second assembly 28 lagging behind and pulled in a similar manner via cable 70. Assembly 28 would once again undergo a limited pivotal free fall once first assembly 26 moved beyond the vertical position above first side wall 22 so the second assembly also moved past this vertical position. Second assembly 28 would thus continue downwardly to sit atop container 12 followed by first assembly 26.

Figure 17:
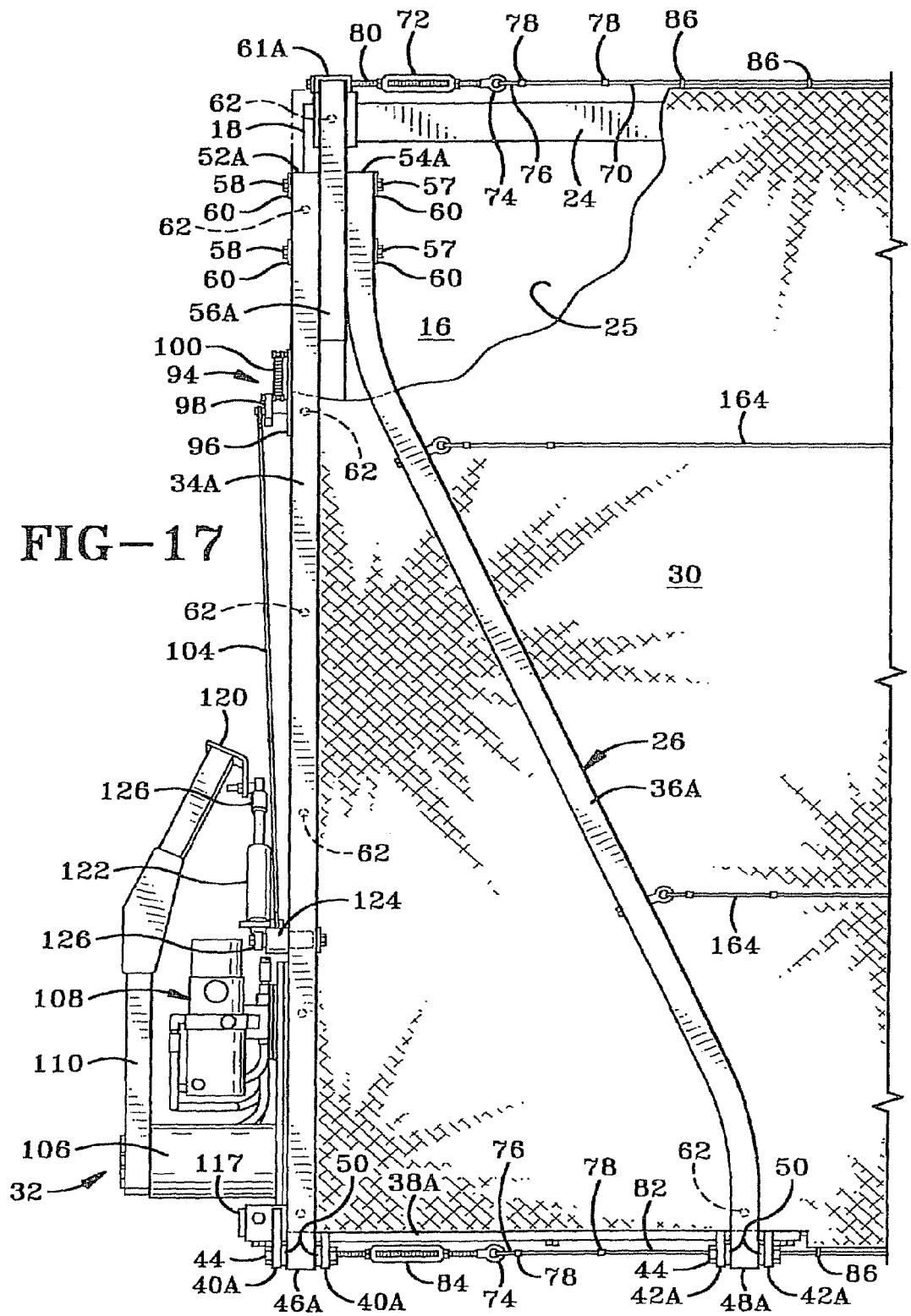
FIG. 17 is similar to FIG. 2A and shows a portion of a pair of catenary cables extending between the front and rear front assemblies.
Figure 18:
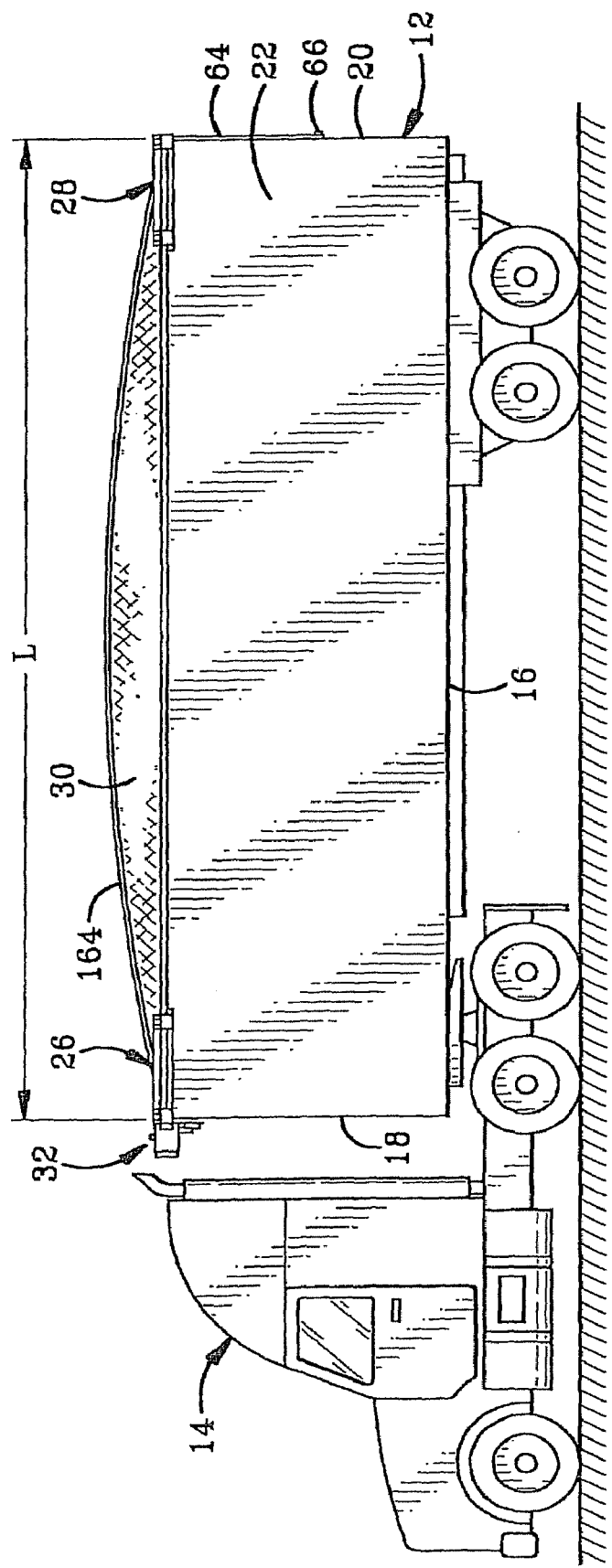
FIG. 18 is similar to FIG. 1 and shows the tarp and catenary cables atop a load within the trailer which is heaped up above the side walls thereof.

Referring to FIG. 17, the tarping system may be modified to include one or more catenary cables or other flexible elongated members which are connected to and extend between first and second assemblies 26 and 28. Cables 164 are shown connected to beam 36A of assembly 26 via eyebolts. Cables 164 are not under tension other than that created by their own weight when in a rested state and are allowed to sag or have slack therein. Thus, as shown FIG. 18, a load within the trailer 12 may be heaped up above the top of the trailer walls so that tarp 30 and the cables 164 may bow upwardly to provide additional room for the load where any applicable maximum height is not exceeded. Cables 164 thus allow for this configuration while giving additional support to tarp 30. It is noted here that the tarping system may be altered to accommodate different length trailers simply by changing the length of the various cables extending between the first and second frame assemblies. When shortening the length, extra cable may be cut off or doubled up. In addition, the cables may simply be replaced by different length cables or the like without substantial cost.

Figure 19:
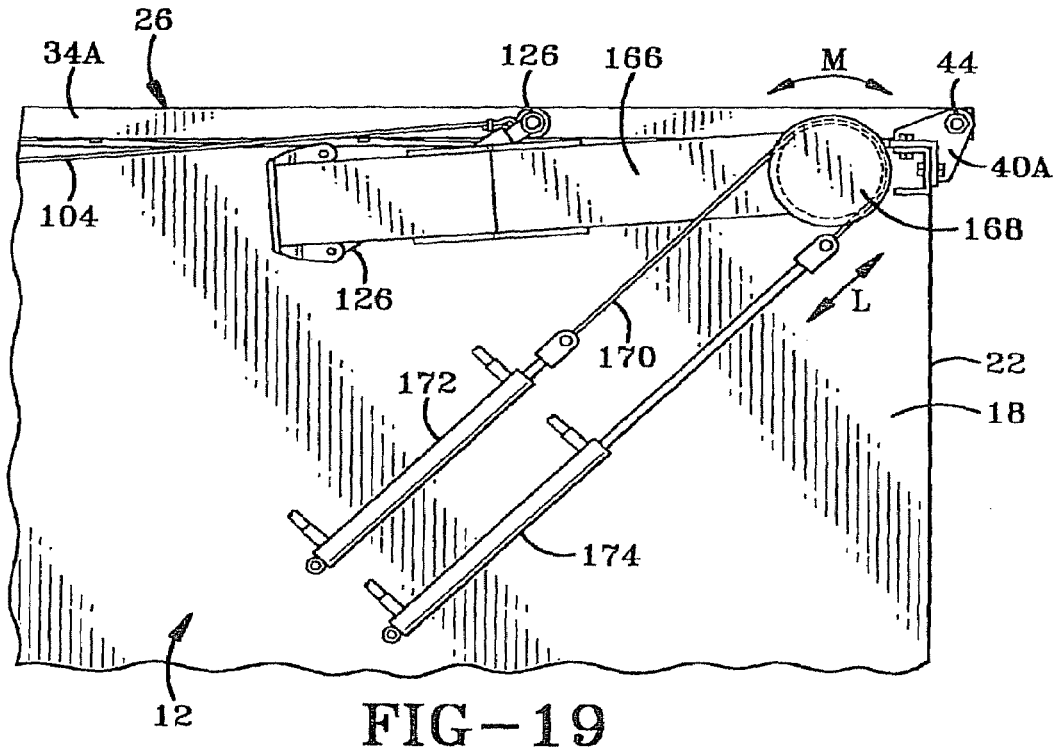
FIG. 19 is an enlarged front elevational view similar to FIG. 5 showing a second embodiment of the actuating mechanism.
Figure 20:
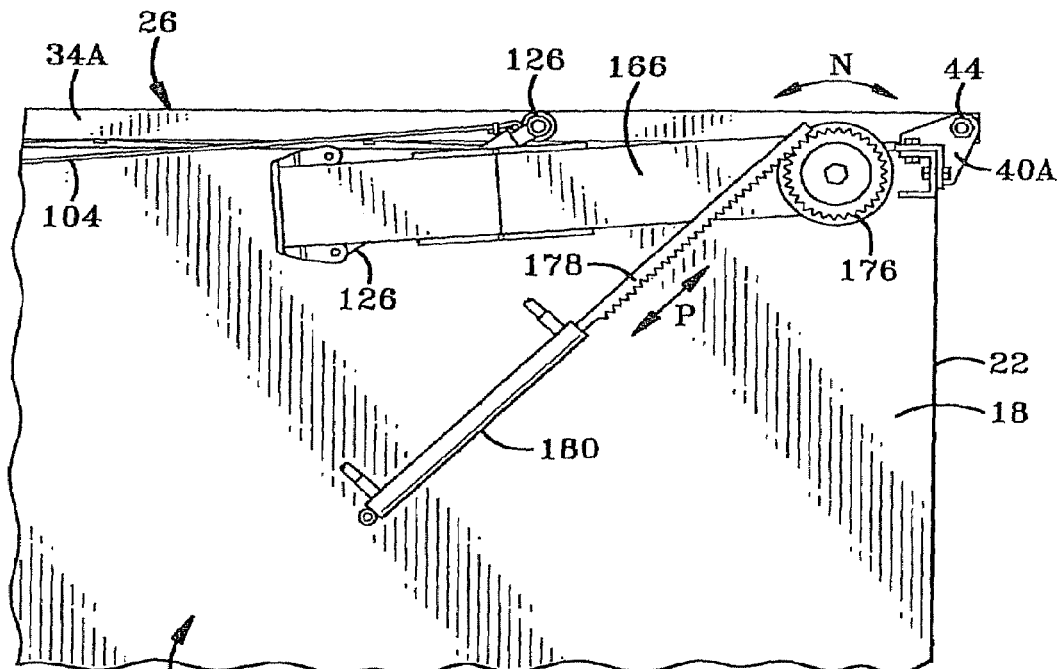
FIG. 20 is similar to FIG. 19 and shows a third embodiment of the actuating mechanism.

FIGS. 19 and 20 show alternate embodiments for driving the flipper assembly. FIG. 19 shows drive arm 166 which is similar to drive arm 110. A cylindrical drum 168 is connected to arm 166 adjacent its inner end and extends outwardly therefrom. A cable 170 is wrapped around drum 166 one and a half times or other suitable amount and is connected adjacent its respective ends to pistons of hydraulic cylinders 172 and 174, which are connected to front wall 18 of trailer 12. Cylinders 172 and 174 may be operated to extend and retract the pistons thereof in an opposite manner (Arrow L) to pull cable 170 to rotate drum 166 and arm 164 (Arrow M) to provide for a covering and uncovering movement of the tarp assembly as previously discussed. Two separate cables attached to the drum 168 may also be used.

FIG. 20 shows a rack and pinion drive mechanism including a pinion 176 which is mounted on arm 164 and a rack 178 which engages and drives pinion 176 to provide rotational movement as indicated at arrow N. Hydraulic cylinder 180 is mounted on front wall 18 for driving rack 178 which is configured as a piston or is connected to a piston of hydraulic cylinder 180 to move as indicated at arrow P. The rotational movement of arm 164 provides the covering and uncovering of the tarping system as previously discussed.

Tarping system 200 is now described referring to FIGS. 21-23. Referring to FIG. 21, system 200 includes first and second tarp assemblies 202 and 204 which are virtually mirror images of one another and respectively pivotally mounted on first and second side walls 22 and 24. Because assemblies 202 and 204 are basically mirror images, only assembly 202 will be described in detail except for the interrelation therebetween. Assembly 202 includes front and rear frame assemblies which are substantially mirror images of one another as in the earlier embodiment. However, only front frame assembly 206 is shown in FIG. 21. Assembly 206 includes a first straight beam 208 and second beam 210 which is curved in a similar fashion as beam 36A except that its central section is angled with respect to second beam 210 to a greater degree. Straight beam 208 may have multiple laterally spaced holes to mount turnbuckle 220 and be cut off to accommodate different widths of trailers. Unlike frame assembly 36A, assembly 206 does not include a third beam sandwiched between the ends of first and second beams 208 and 210. Instead, first and second beams 208 and 210 are connected directly to one another by bolt 212, nut 214 and a pair of fender washers 216. A cable assembly 217 comprising a cable 218 and turnbuckle 220 configured in the same fashion as previously described extends between the front and rear frame assemblies. However, turnbuckle 220 is connected to first beam 208 adjacent a free end 222 thereof distal its pivoting end. Cable 218 is likewise connected to the analogous of first beam of the rear assembly. Unlike frame assembly 26 of tarping system 10, frame assembly 206 does not include a downward extension for mounting the cable assembly thereon. Thus, cable assembly 217 is mounted above top 17 of trailer 12 and extends from front wall 18 to the rear wall (not shown in FIG. 21) of trailer 12 over interior chamber 25. Depending on the length of cable 218 and the amount of tension that it may be under, it may or may not droop below top 17 into interior chamber 25 between the front and rear walls of trailer 12. First and second beams 208 and 210 are pivotally mounted in the same manner as assembly 26 of tarping system 10 and thus include base 38A, ears 40A and 42A and so forth. Cable 82 and turnbuckle 84 are mounted in the same fashion as described in tarping system 10. A tarpaulin 224 may be mounted on the frame assemblies and cable assemblies in the same manner as previously described by fasteners 62 and zip ties 86 or in the alternate ways previously discussed. Tarpaulin 224 extends from first wall 22 of trailer 12 to beyond the midpoint between side walls 22 and 24. Thus, the cable assemblies 217 of each up top assemblies 202 and 204 run parallel and adjacent to one another near the midway point between wall 22 and 24 while the tarpaulins 224 overlap in the center. The free ends 222 of the respective beams 208 are disposed closely adjacent and facing one another adjacent this midpoint with beams 208 aligned with one another.

The drive mechanism for rotating tarp assembly 202 out of the covered position is very similar to that previously described. The drive mechanism includes rotary actuator 106, link 122 and boss 124 which is previously discussed. A drive arm 226 which is a solid member instead of the hollow drive arm 110 of system 10 as used. Drive arm 226 is mounted in a substantially similar manner to the rotational drive shaft of actuator 106 and to link 122 in the same manner as previously discussed. Power pack 108 is used but is mounted centrally on front wall 18 and configured for use with both of the drive mechanisms of tarp assemblies 202 and 204. To that effect, hydraulic lines 116 are configured to provide power to each of actuators 106.

In operation, the drive mechanism works in substantially the same manner as previously described except that latch assembly 94 is not used. A hook 223 is attached to the link 122. In the covered position, hook 223 rotates under a pin 225 that is stationary with the front wall 18 to lock the beams 208 to the front wall. This same latching mechanism may be used on other embodiments. Thus, an electronic control as previously described is used to operate power pack 108 to provide hydraulic power to each of rotary actuators 106 to move each of tarp assemblies 202 and 204 between their respective covered positions shown in FIGS. 21 and 22 to an open position shown in FIG. 23 and ultimately to a stowed position beside respective side walls 22 and 24. While the stowed position is not shown, it is substantially the same as the stowed position with system 10 except for the assemblies 202 and 204 come down about half the distance. One advantage to the use of the two tarp assemblies 202 and 204 is the lesser torque requirement for opening each of them compared to that of the tarping assembly of system 10 which extends all the way across the trailer. Another advantage is that less room is required to the side of the trailer during the deployment of the tarping system 200. Another advantage is that there is less area for wind to act upon, causing less stress, during deployment of tarping system 200.

Thus, tarping systems 10 and 200 provide for several advantages over the prior art systems as previously discussed.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A covering system for use with an open top container, the system comprising:
   a cover comprising a first frame member and pivotally mounted about a longitudinally extending first axis between a generally horizontal covered position adapted to cover the open top container and an uncovered position adapted to allow access to the open top;
   a drive arm pivotable about a longitudinally extending second axis which is fixed relative to the first axis;
   a link directly pivotally connected to the drive arm about a longitudinally extending third axis which is movable relative to the first and second axes; the link directly pivotally connected to the first frame member about a longitudinally extending fourth axis which is movable relative to the first and second axes; wherein the link is extendable and retractable.

2. The system of claim 1 wherein the link allows the drive arm to pivot between a first position in which the drive arm is over center with respect to the fourth axis in a first direction and a second position in which the drive arm is over center with respect to the fourth axis in a second direction opposite the first direction.

3. A covering system for use with an open top container, the system comprising:
   a cover comprising a first frame member and pivotally mounted about a longitudinally extending first axis between a generally horizontal covered position adapted to cover the open top container and an uncovered position adapted to allow access to the open top;
   a drive arm pivotable about a longitudinally extending second axis which is fixed relative to the first axis;
   a link directly pivotally connected to the drive arm about a longitudinally extending third axis which is movable relative to the first and second axes; the link directly pivotally connected to the first frame member about a longitudinally extending fourth axis which is movable relative to the first and second axes;
   a rotary actuator having a rotational drive shaft which rotates about the second axis;
   first and second opposed ends on the drive arm; and
   wherein the drive arm adjacent the first end is secured to the drive shaft and extends radially outwardly therefrom to the second end.

4. The system of claim 3 wherein the link is extendable and retractable.

5. A covering system for use with an open top container, the system comprising:
   a cover comprising a first frame member and pivotally mounted about a longitudinally extending first axis between a generally horizontal covered position adapted to cover the open top container and an uncovered position adapted to allow access to the open top;
   a drive arm pivotable about a longitudinally extending second axis which is fixed relative to the first axis;
   a link directly pivotally connected to the drive arm about a longitudinally extending third axis which is movable relative to the first and second axes; the link directly pivotally connected to the first frame member about a longitudinally extending fourth axis which is movable relative to the first and second axes;
   wherein the drive arm pivots 270 degrees about the second axis to pivotally move the cover from the covered position and the uncovered position.

6. A covering system for use with an open top container, the system comprising:
   a cover comprising a first frame member and pivotally mounted about a longitudinally extending first axis between a generally horizontal covered position adapted to cover the open top container and an uncovered position adapted to allow access to the open top;
   a drive arm pivotable about a longitudinally extending second axis which is fixed relative to the first axis;
   a link directly pivotally connected to the drive arm about a longitudinally extending third axis which is movable relative to the first and second axes; the link directly pivotally connected to the first frame member about a longitudinally extending fourth axis which is movable relative to the first and second axes;
   wherein the third axis moves higher than the first axis to move the cover out of the closed position.

7. A covering system for use with an open top container, the system comprising:
- a cover comprising a first frame member and pivotally mounted about a longitudinally extending first axis between a generally horizontal covered position adapted to cover the open top container and an uncovered position adapted to allow access to the open top;
- a drive arm pivotable about a longitudinally extending second axis which is fixed relative to the first axis;
- a link directly pivotally connected to the drive arm about a longitudinally extending third axis which is movable relative to the first and second axes; the link directly pivotally connected to the first frame member about a longitudinally extending fourth axis which is movable relative to the first and second axes;
- wherein the first frame member pivots upwardly and to the right to move out of the closed position; and the third axis moves from the left of the first axis to the right of the first axis during movement of the cover from the closed position to the open position.

8. The system of claim 7 wherein the third axis moves higher than the first axis to move the cover out of the closed position.

9. A covering system for use with an open top container, the system comprising:
- a cover comprising a first frame member and pivotally mounted about a longitudinally extending first axis between a generally horizontal covered position adapted to cover the open top container and an uncovered position adapted to allow access to the open top;
- a drive arm pivotable about a longitudinally extending second axis which is fixed relative to the first axis;
- a link directly pivotally connected to the drive arm about a longitudinally extending third axis which is movable relative to the first and second axes; the link directly pivotally connected to the first frame member about a longitudinally extending fourth axis which is movable relative to the first and second axes;
- wherein the first frame member pivots upwardly and to the right to move out of the closed position; and the third axis is to the left of the second axis in the closed position.

10. The system of claim 9 wherein the fourth axis is to the left of the second axis in the closed position.

11. A covering system for use with an open top container, the system comprising:
- a cover comprising a first frame member and pivotally mounted about a longitudinally extending first axis between a generally horizontal covered position adapted to cover the open top container and an uncovered position adapted to allow access to the open top;
- a drive arm pivotable about a longitudinally extending second axis which is fixed relative to the first axis;
- a link directly pivotally connected to the drive arm about a longitudinally extending third axis which is movable relative to the first and second axes; the link directly pivotally connected to the first frame member about a longitudinally extending fourth axis which is movable relative to the first and second axes;
- wherein the first frame member pivots upwardly and to the right to move out of the closed position; and the fourth axis is to the left of the second axis in the closed position.

12. The system of claim 11 wherein the third axis is to the left of the fourth axis in the closed position.

13. A covering system for use with an open top container, the system comprising:
- a cover comprising a first frame member and pivotally mounted about a longitudinally extending first axis between a generally horizontal covered position adapted to cover the open top container and an uncovered position adapted to allow access to the open top;
- a drive arm pivotable about a longitudinally extending second axis which is fixed relative to the first axis;
- a link directly pivotally connected to the drive arm about a longitudinally extending third axis which is movable relative to the first and second axes; the link directly pivotally connected to the first frame member about a longitudinally extending fourth axis which is movable relative to the first and second axes;
- a catch adapted to mount on the open top container;
- a latch mounted on the first frame member and movable between a latched position engaged with the catch and an unlatched position disengaged from the catch; and
- wherein the latch moves from the latched position to the unlatched position in response to pivotal movement of the drive arm.

14. The system of claim 13 further comprising a release cable connected to and extending outwardly from the latch; and wherein the release cable moves the latch from the latched position to the unlatched position in response to pivotal movement of the drive arm.

15. The system of claim 14 wherein the release cable is connected to the link.

16. A covering system for use with an open top container, the system comprising:
- a cover comprising a first frame member and pivotally mounted about a longitudinally extending first axis between a generally horizontal covered position adapted to cover the open top container and an uncovered position adapted to allow access to the open top;
- a drive arm pivotable about a longitudinally extending second axis which is fixed relative to the first axis;
- a link directly pivotally connected to the drive arm about a longitudinally extending third axis which is movable relative to the first and second axes; the link directly pivotally connected to the first frame member about a longitudinally extending fourth axis which is movable relative to the first and second axes;
- in combination with the open top container; wherein the open top container comprises first and second longitudinally spaced end walls each having a top and bottom, and right and left axially spaced longitudinally extending sidewalls each having a top and bottom and extending between and connected to the first and second end walls whereby the end walls and sidewalls define therewithin an interior chamber with an entrance opening defined by the respective tops of the four walls; the first axis is adjacent the top of the right sidewall; and the second axis is adjacent the top of the right sidewall.

17. A covering system for use with an open top container, the system comprising:
- a cover comprising a first frame member and pivotally mounted about a longitudinally extending first axis between a generally horizontal covered position adapted to cover the open top container and an uncovered position adapted to allow access to the open top;
- a drive arm pivotable about a longitudinally extending second axis which is fixed relative to the first axis;
- a link directly pivotally connected to the drive arm about a longitudinally extending third axis which is movable relative to the first and second axes; the link directly pivotally connected to the first frame member about a longitudinally extending fourth axis which is movable relative to the first and second axes;

in combination with the open top container; wherein the open top container comprises first and second longitudinally spaced end walls each having a top and bottom, and right and left axially spaced longitudinally extending sidewalls each having a top and bottom and extending between and connected to the first and second end walls whereby the end walls and sidewalls define therewithin an interior chamber with an entrance opening defined by the respective tops of the four walls; the first axis is adjacent the top of the right sidewall; and the third axis is to the left of the second axis in the closed position.

18. The combination of claim 17 wherein the fourth axis is to the left of the second axis in the closed position.

19. A covering system for use with an open top container, the system comprising:
- a cover comprising a first frame member and pivotally mounted about a longitudinally extending first axis between a generally horizontal covered position adapted to cover the open top container and an uncovered position adapted to allow access to the open top;
- a drive arm pivotable about a longitudinally extending second axis which is fixed relative to the first axis;
- a link directly pivotally connected to the drive arm about a longitudinally extending third axis which is movable relative to the first and second axes; the link directly pivotally connected to the first frame member about a longitudinally extending fourth axis which is movable relative to the first and second axes;
- in combination with the open top container; wherein the open top container comprises first and second longitudinally spaced end walls each having a top and bottom, and right and left axially spaced longitudinally extending sidewalls each having a top and bottom and extending between and connected to the first and second end walls whereby the end walls and sidewalls define therewithin an interior chamber with an entrance opening defined by the respective tops of the four walls; the first axis is adjacent the top of the right sidewall; and the fourth axis is to the left of the second axis in the closed position.

20. The combination of claim 19 wherein the third axis is to the left of the fourth axis in the closed position.

* * * * *